(12) United States Patent
Fulghum et al.

(10) Patent No.: US 6,580,930 B1
(45) Date of Patent: Jun. 17, 2003

(54) SIGNAL DETECTOR SELECTOR AND METHOD FOR SELECTING A DETECTOR

(75) Inventors: Tracy L. Fulghum, Durham, NC (US); Sandeep Chennakeshu, Cary, NC (US); R. David Koilpillai, Apex, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/292,261

(22) Filed: Apr. 15, 1999

(51) Int. Cl.[7] .................................................. H04B 7/26
(52) U.S. Cl. ........................ 455/574; 455/343; 370/311
(58) Field of Search ................................ 370/311, 318, 370/349, 347; 455/574, 343, 127, 419, 67.3, 263, 312, 337

(56) References Cited

U.S. PATENT DOCUMENTS

| | | | |
|---|---|---|---|
| 5,212,803 A | 5/1993 | Uddenfeldt et al. | |
| 5,214,391 A | 5/1993 | Serizawa et al. | ............ 329/316 |
| 5,230,077 A | 7/1993 | Raith | |
| 5,283,531 A | 2/1994 | Serizawa et al. | |
| 5,434,886 A | 7/1995 | Kazawa et al. | ............. 375/262 |
| 5,550,868 A | 8/1996 | Boccuzzi | .................... 375/330 |
| 5,606,548 A * | 2/1997 | Vayrynen et al. | ........... 370/252 |
| 5,767,738 A | 6/1998 | Brown et al. | ................ 329/304 |
| 5,770,927 A | 6/1998 | Masami | ...................... 375/340 |
| 5,848,106 A | 12/1998 | Khayrallah | ................. 375/340 |
| 5,953,646 A * | 9/1999 | Hirasawa | .................... 340/7.33 |
| 6,084,926 A | 7/2000 | Kellam et al. | |
| 6,236,674 B1 * | 5/2001 | Morelli et al. | .............. 375/219 |
| 6,272,116 B1 * | 8/2001 | Kurihara | ..................... 370/311 |
| 6,333,953 B1 | 12/2001 | Bottomley et al. | |

FOREIGN PATENT DOCUMENTS

| | | | |
|---|---|---|---|
| EP | 0739117 | 10/1996 | .......... H04L/27/22 |
| EP | 0802657 | 10/1997 | .......... H04L/27/22 |
| GB | 2320863 | 7/1998 | .......... H04L/27/22 |
| WO | WO 96/31970 | 10/1996 | |

* cited by examiner

Primary Examiner—Thanh Cong Le
Assistant Examiner—Nick Corsaro
(74) Attorney, Agent, or Firm—Moore & Van Allen, PLLC; Gregory Stephens

(57) ABSTRACT

A detector selector and method are provided for selecting among detectors, where a less complex detector detects known symbols in a received signal, and a bit error rate for the known symbols is used to determine whether the less complex detection method is sufficient. If the less complex detector is not sufficient, a more complex detector is used to detect the signal. Additionally, assured symbols are used as known symbols to increase the accuracy for the determination of whether the less complex detector is sufficient.

27 Claims, 22 Drawing Sheets

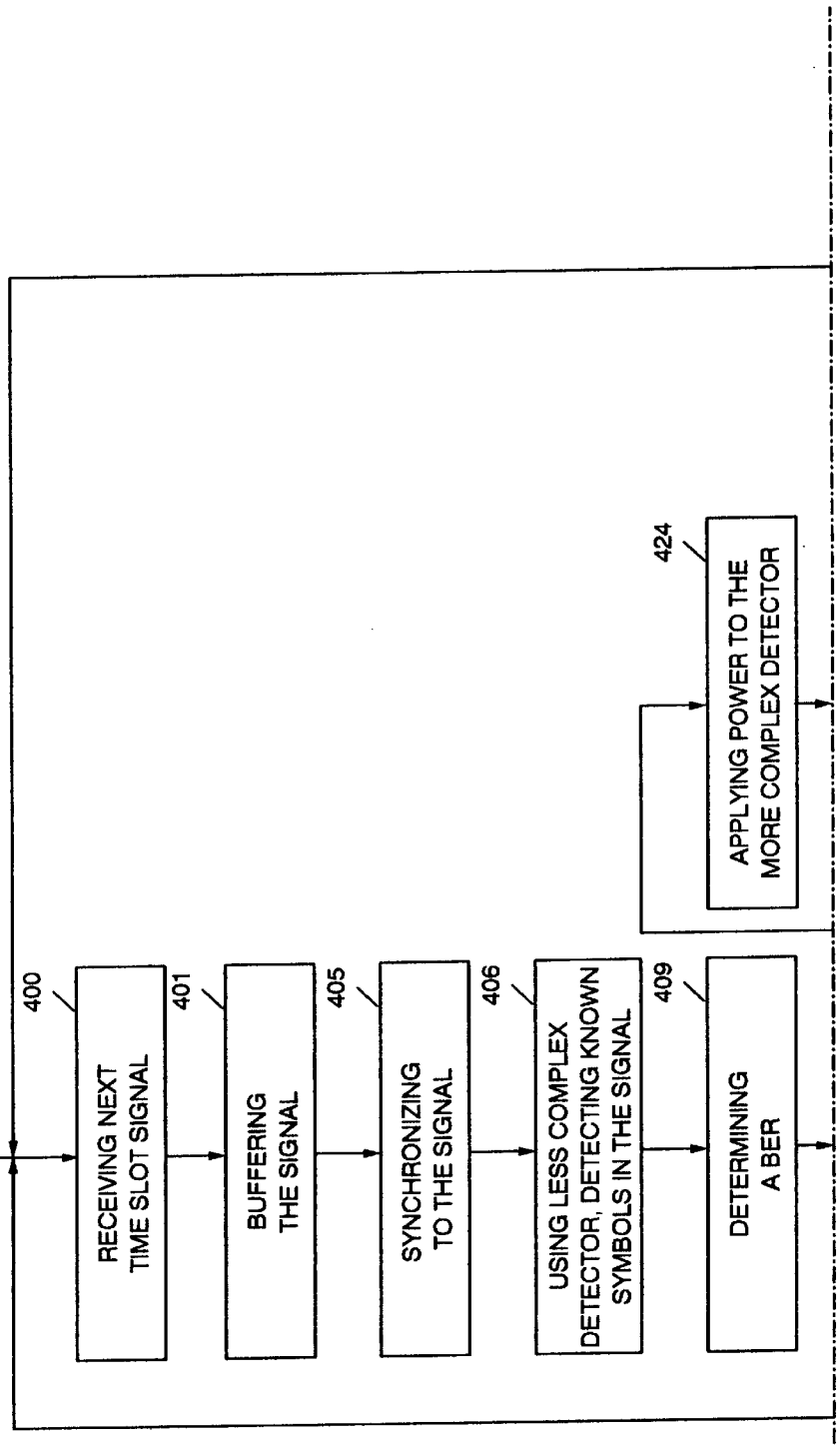

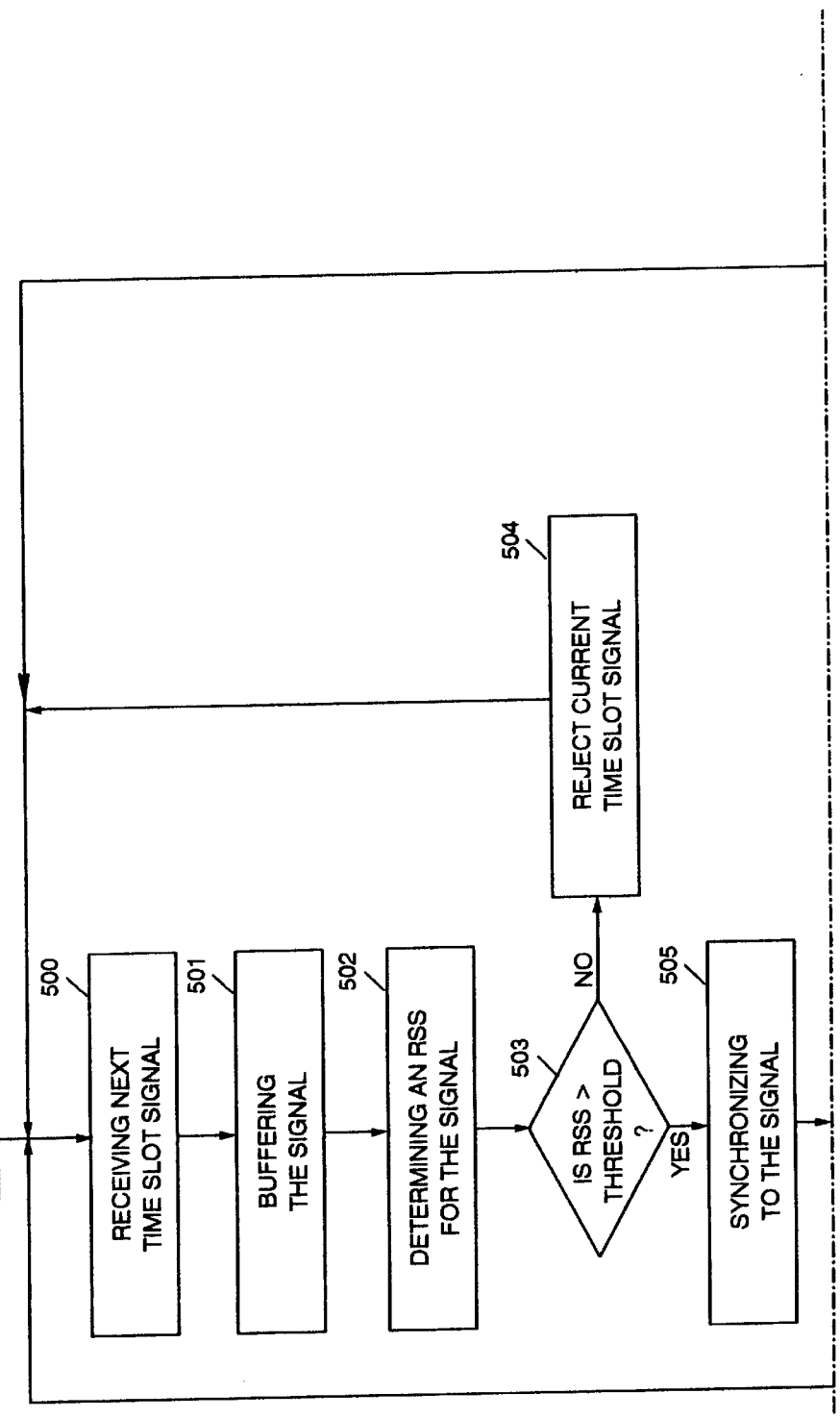

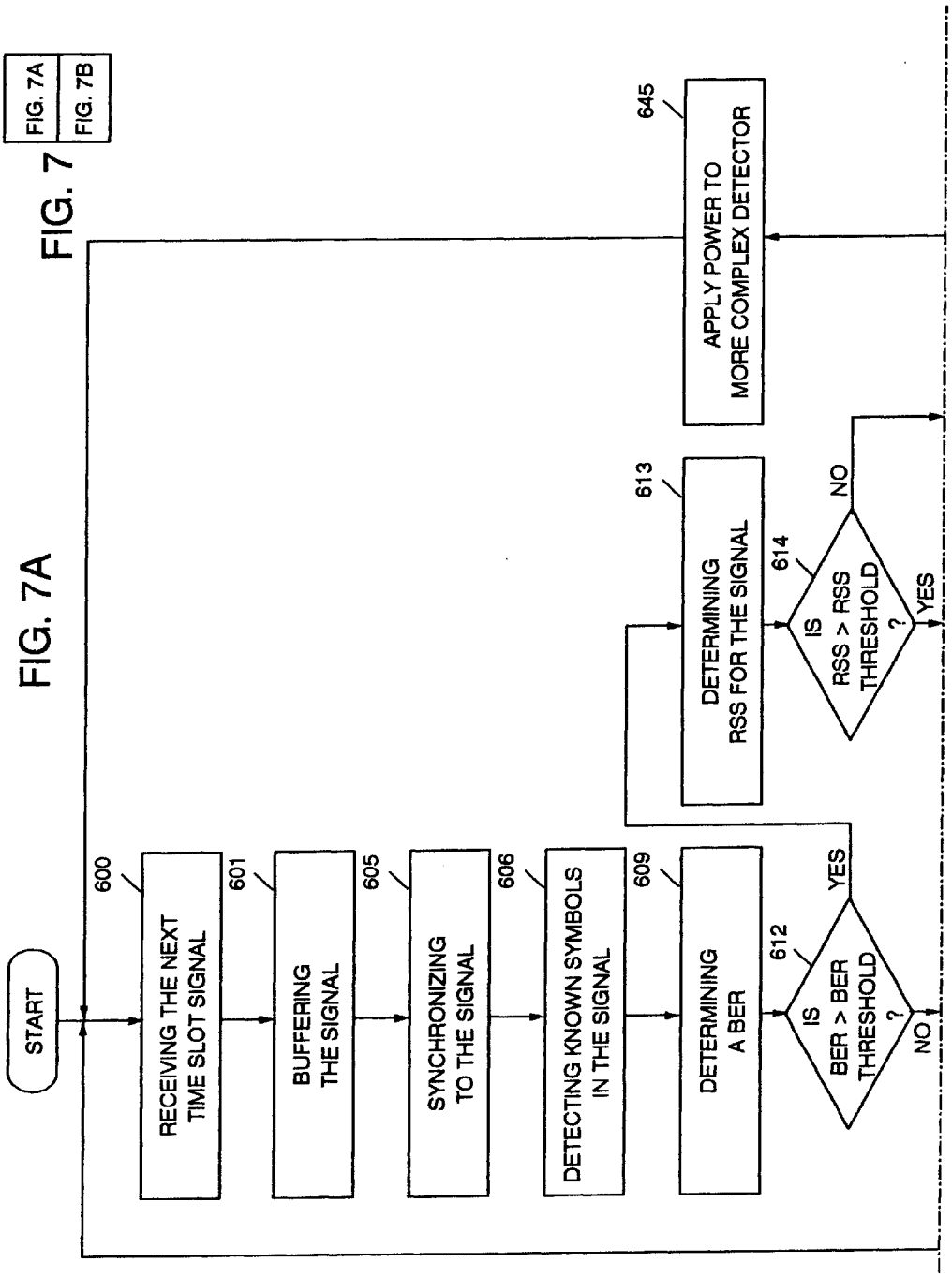

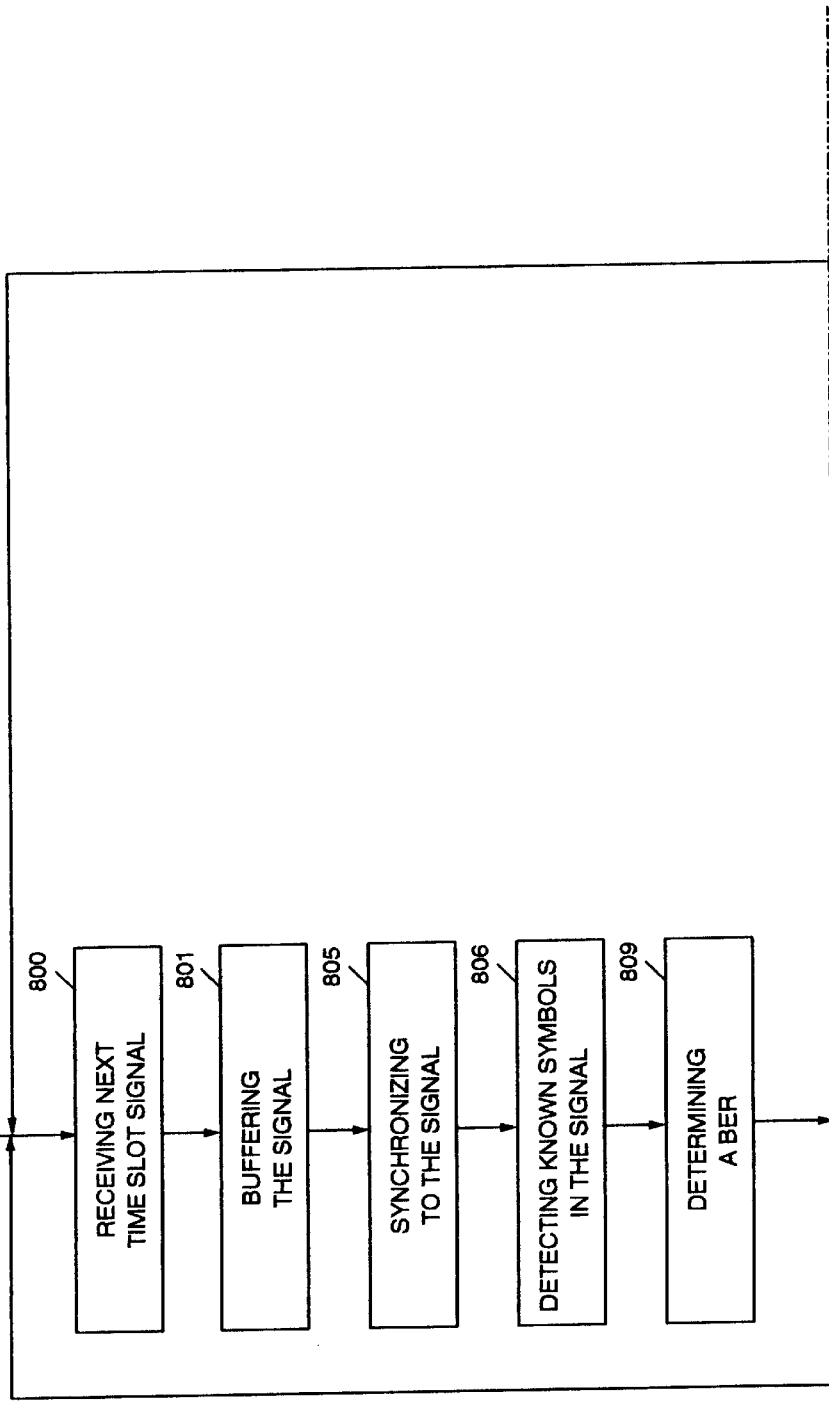

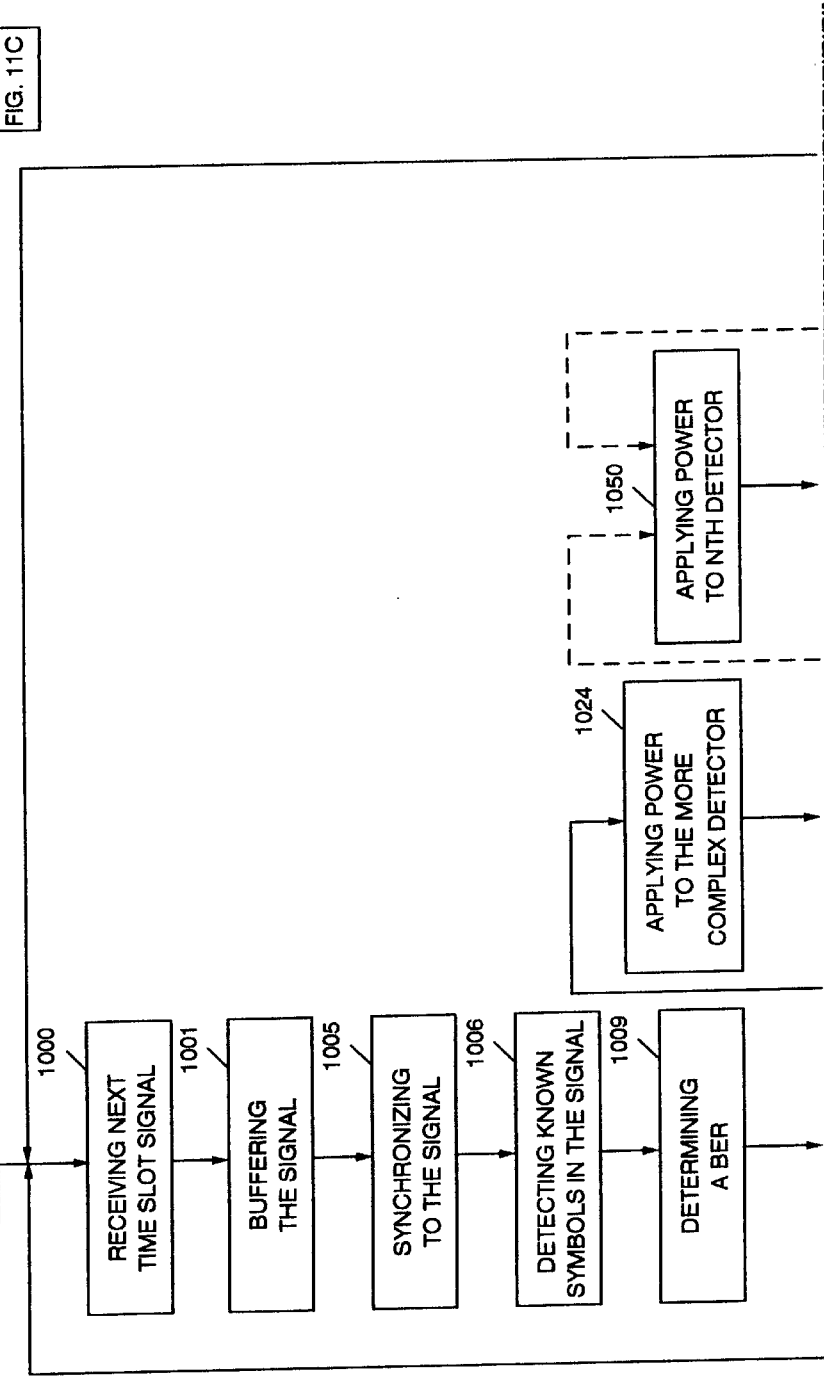

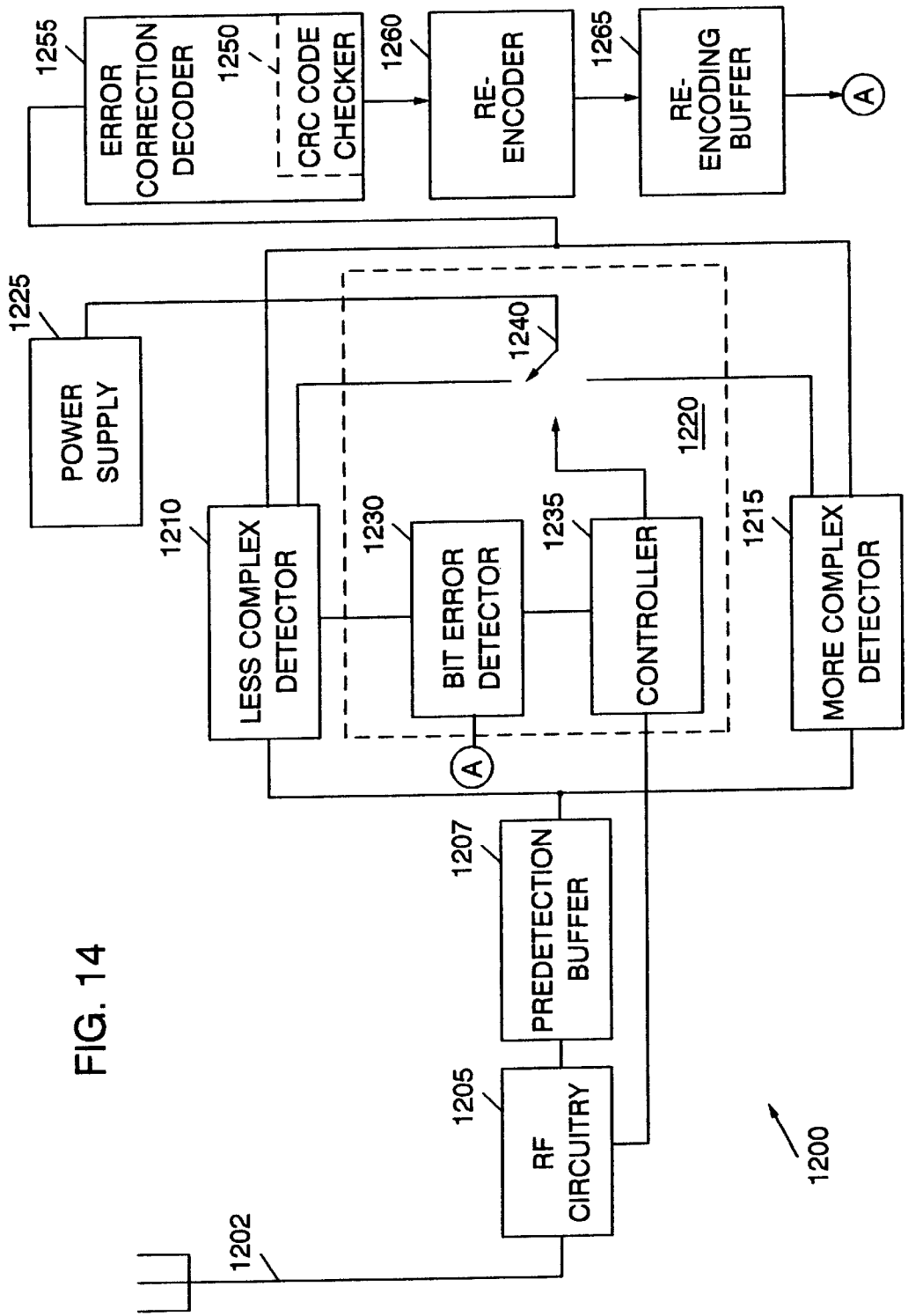

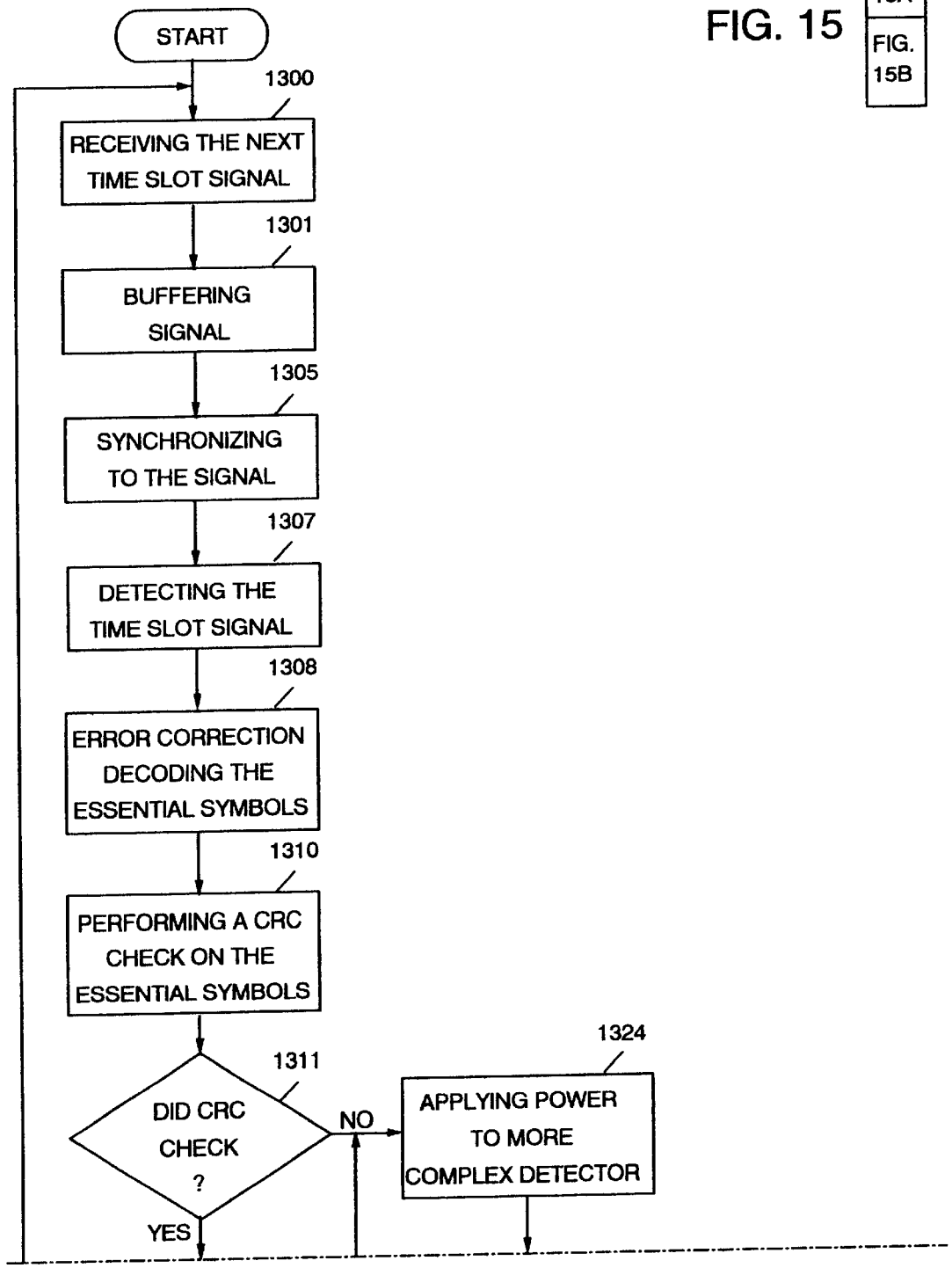

US 6,580,930 B1

SIGNAL DETECTOR SELECTOR AND METHOD FOR SELECTING A DETECTOR

FIELD OF THE INVENTION

The present invention is directed to the detection of a signal in a battery powered station, and in particular, the selection of a detector based on the detection of known symbols in a transmitted signal.

BACKGROUND OF THE INVENTION

As mobile cellular stations typically operate from a battery power supply, available supply power is often limited. Therefore, during operation, minimum power consumption by the mobile cellular station is desired. Known mobile stations attempt minimum power consumption by operating using the least complex of two or more-detectors.

A detector is used in a mobile cellular station to separate information from a received signal. Some detectors are more sophisticated than others and are better able to detect the desired signal in the presence of noise, co-channel interference, or intersymbol interference. However, the more sophisticated the detector, the greater the power consumption by the detector. For example, a detector utilizing differential detection (differential detector) is adequate for detecting a signal transmitted over a channel with little or no interference (a "flat" channel) and consumes little power during operation. However, a detector utilizing equalization (equalizer) is required where the received signal has intersymbol interference (ISI), as in a channel subject to multipath interference, and consumes many times the power consumed by the differential detector.

A known mobile station selects a detector by assuming that the transmission channel is flat. A time slot of a received signal is stored into a buffer, and a less complex detector is used to detect the entire time slot of data. It must then be determined if the less complex detector has adequately detected the signal. To do this, the mobile station error correction decoder decodes the detected information and performs a cyclic redundancy check (CRC) on the decoded data using the CRC code. If the CRC code does not check, it is determined that the less complex detector is not adequate, and the mobile cellular station redetects the buffered signal using an equalizer. However, error correction decoding consumes approximately as much power as the equalization process performed by the equalizer.

SUMMARY OF THE INVENTION

An apparatus and method of selecting one of a plurality of detectors of differing complexity in a digital communications system using a signal having a plurality of known symbols, for example, a synchronization sequence, includes detecting the known symbols in the received signal using a less complex detector. A bit error rate (BER) is determined by comparing the detected symbols to the plurality of known symbols. The less complex detector is used if the bit error rate does not exceed a threshold, and a more complex detector is used if the bit error rate exceeds the threshold. In this way, a detector is selected using only the known symbols and without performing error correction decoding, thereby conserving power.

More specifically, where the signal is transmitted as a plurality of information packets with each information packet including the known symbols, the BER may be a running BER calculated by averaging errors of the known symbols of each information packet for a plurality of information packets.

Further, the received signal is stored in a buffer and the less complex detector detects the known symbols from the buffered signal. If the BER exceeds the BER threshold, the more complex detector is used to detect the buffered signal.

In another aspect, a Received Signal Strength Indication (RSSI) is determined for the signal. If the RSSI is less than a first RSSI threshold, the signal is rejected as no detector is adequate for detecting the signal. Further, the signal is rejected if the bit error rate exceeds the threshold and the RSSI is less than a second RSSI threshold.

In yet another aspect, the bit error rate is a first bit error rate and a second bit error rate is determined for the more complex detector wherein if the second bit error rate is not excessive, the more complex detector is used, and if the second bit error rate is excessive, bit error rates for increasingly complex detectors are determined until a detector with an acceptable bit error rate is found.

In addition, where the signal includes an accuracy verification code for essential symbols in the signal, used for determining if the essential symbols are detected and error correction decoded accurately by the receiver, the known symbols comprise a plurality of assured symbols. The assured symbols are generated by verifying the essential symbols using the accuracy verification code, and error correction reencoding the verified essential symbols. Where the cellular communications system is a time division multiple access system, the accuracy verification code is the cyclic redundancy check code.

BRIEF DESCRIPTION OF THE DRAWINGS

FIG. 14 is a further embodiment of a block diagram illustrating a signal detector selector which generates assured symbols.

DETAILED DESCRIPTION OF THE INVENTION

Before discussing the detector selector circuitry and method, it is helpful to understand the data format of the signal used in a time division multiple access (TDMA) cellular system.

Figure 1:
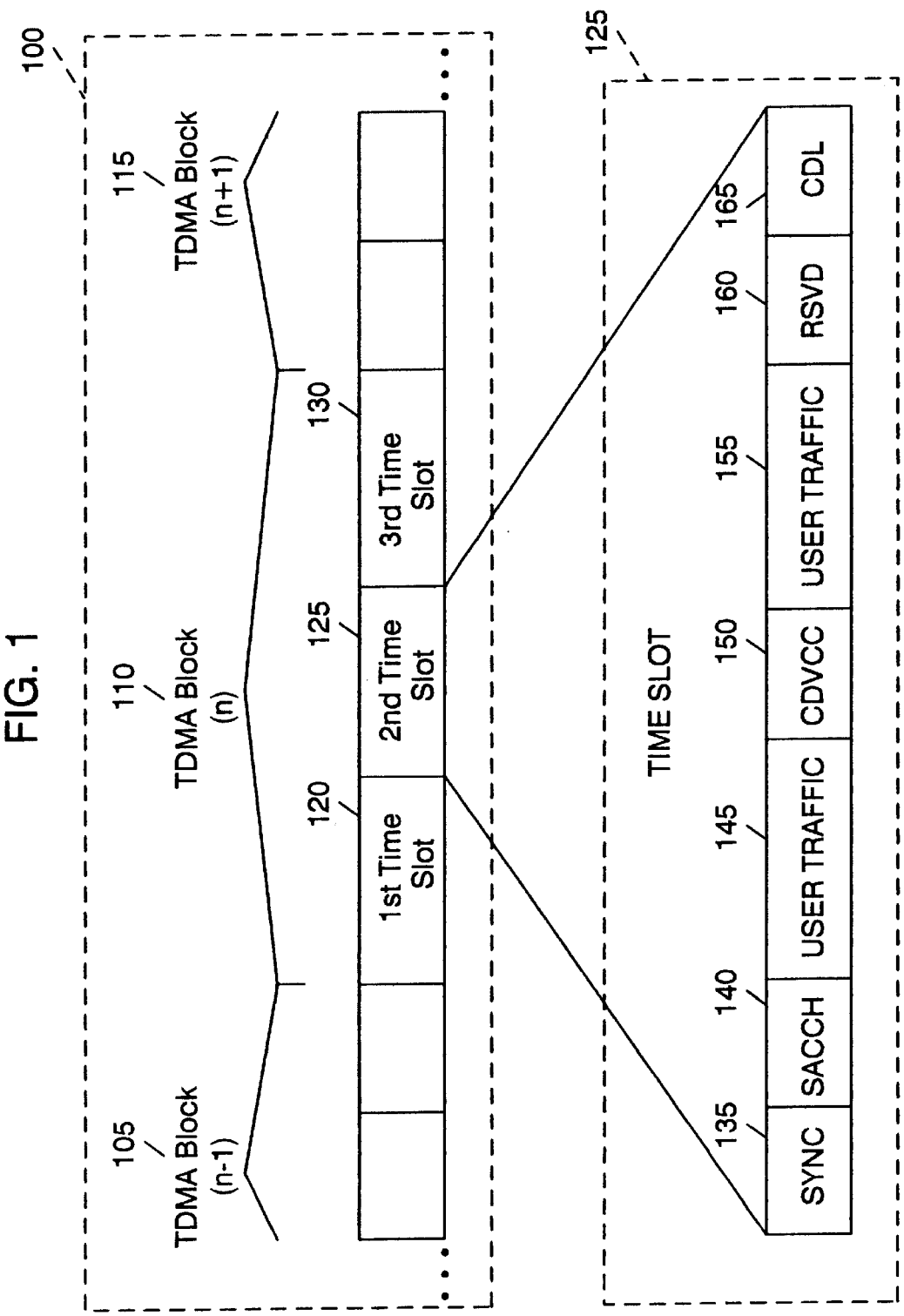
FIG. 1 is a diagram of the transmission format for a TDMA cellular telephone system.

The transmission format for a TDMA cellular telephone system from a base station to a mobile station is shown in FIG. 1 and comprises a plurality of TDMA blocks 100 represented by, for example, TDMA block (n−1) 105, TDMA block (n) 110, and TDMA block (n+1) 115. Each TDMA block has three time slots, each time slot being a communication link between a base and mobile cellular station. The TDMA block (n) 110 is shown having a first time slot 120, a second time slot 125, and a third time slot 130. Each time slot includes fields for supplying the cellular station with control or user information. For example, the second time slot 125 has a synchronization field 135, a slow associated control channel (SACCH) 140, a first user traffic field 145, a coded digital verification color code (CDVCC) 150, a second user traffic field 155, a reserved field 160, and a coded digital control channel locator (CDL) field 165. Generally, the user traffic fields 145 and 155 provide information, such as voice, for the user of the cellular station. The remaining fields of the time slot 125 provide control information for the cellular station itself.

Some fields of the time slot 125 are assigned specific content at call setup when a time slot is assigned to the cellular station. For example, one of six available SYNC-WORDs is assigned to the synchronization field 135 at call setup to synchronize the cellular station to a received signal. Additionally, one of 255 available CDVCCs is assigned to the CDVCC field 150 to allow the cellular station to distinguish among signals transmitted by other cellular stations transmitting on the same frequency in the same time slot.

The first time slot 120 and the third time slot 130 have the same format as the second time slot 125. Additionally, TDMA block (n−1) 105 and TDMA block (n+1) 115 have the same format as TDMA block (n) 110.

Fields of a time slot containing essential symbols important to operation of the cellular station are encoded with a CRC code and error correction encoded to ensure accuracy of the information. The CRC code is an accuracy verification code used by the error correction decoder of the receiver to determine if the received signal has been detected and decoded accurately. For example, information transmitted in the SACCH data field 140 and parts of the user traffic data fields 145 and 155 is encoded with a CRC code and then error correction encoded by the transmitting station. Error correction encoding adds redundancy to the transmitted data, and is used by an error correction decoder to reconstruct data degraded by interference or noise over the transmission path. After being received and detected by the receiving station, the essential symbols are error correction decoded, and the CRC code is used to check if the decoded information is correct.

Figure 2:
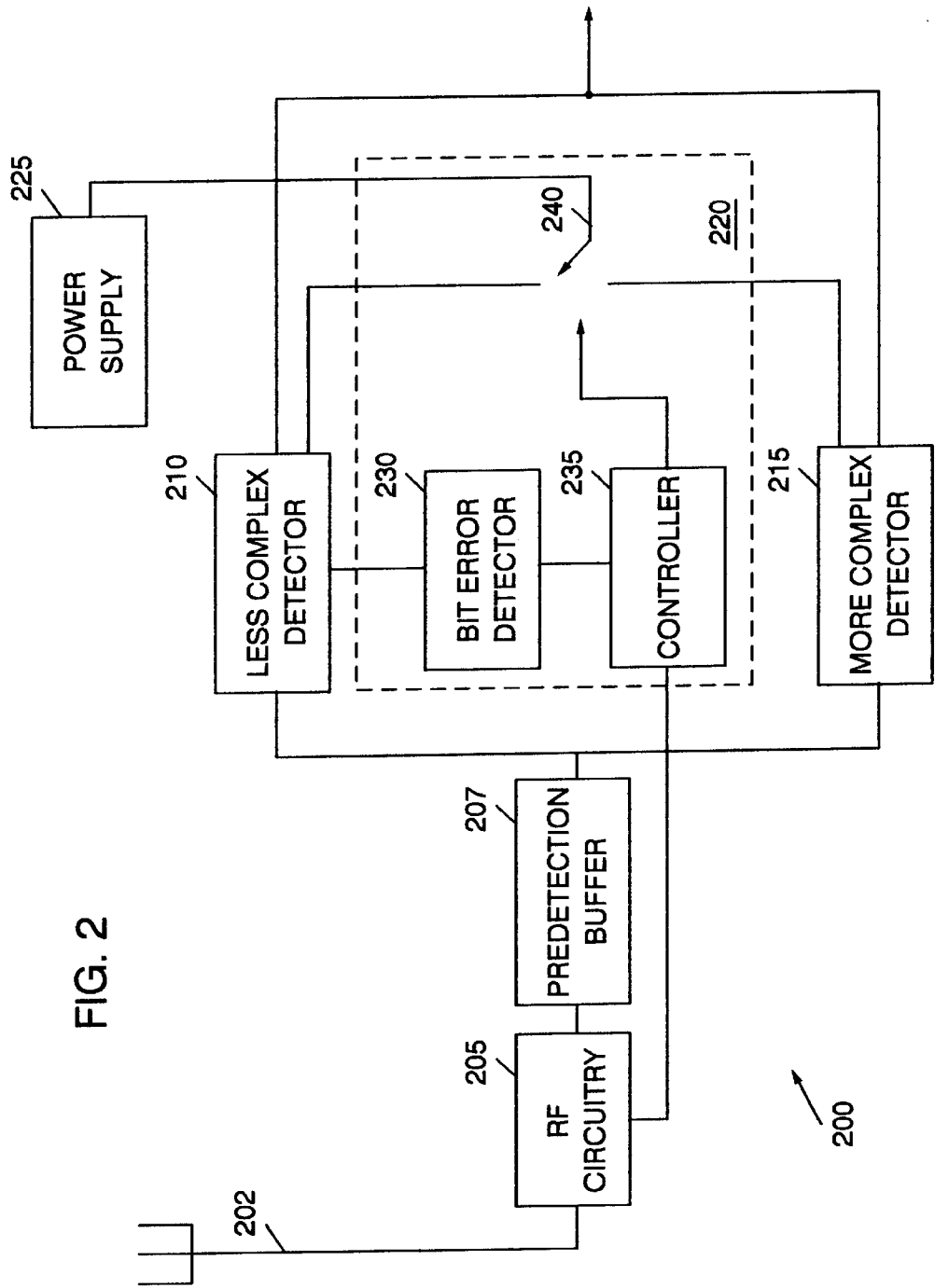
FIG. 2 is a block diagram illustrating a signal detector selector with power applied to either a first or a second detector.

A basic or simplified form of the detector selector is shown in FIG. 2.

A receiver 200 includes an antenna 202 coupled to RF circuitry 205, which filters, downconverts and amplifies the received signal. Circuitry 205 is coupled to buffer 207 which stores the signal. Buffer 207 is coupled to a less complex detector 210 and a more complex detector 215, for detecting the signal. A BER is determined for known symbols detected by the detector in use by a signal detector selector 220 which is coupled to the circuitry 205, the detectors 210 and 215, and a power supply 225. The detector selector 220 selects the more complex detector if the BER exceeds a BER threshold. Less complex detector 210 and more complex detector 215 are coupled to the rest of the cellular station (not shown), where the detected signal is processed. The signal detector selector 220 comprises a bit error detector 230, a controller 235, and an actuator (switch) 240. Operation of the receiver 200 utilizing the signal detector selector 220 will be described in conjunction with the flow chart of FIG. 3.

The detector selection begins with a signal received at antenna 202 in block 250. The signal is transferred to the RF circuitry 205 where it is down converted, filtered and amplified for further processing. Buffer 207 buffers the signal as shown by block 252. The method continues to block 255 where the less complex detector 210 synchronizes to the received signal. The less complex detector 210 detects the known symbols of the received signal, shown in block 260. Using a greater number of known symbols for the signal detector selection process increases the accuracy of the detector selection, as discussed infra with respect to this figure. As the less complex detector 210 is synchronized to the received signal, it is able to selectively detect those portions of the received signal comprising the known symbols.

The bit error detector 230 determines a BER for the known symbols, block 265. The known symbols are predetermined symbols in one or more fields of the received signal. The bit error detector 230 determines the BER by comparing detected symbols at locations corresponding to the known symbols with predetermined symbol values. In block 270, it is determined by the controller 235 whether the BER is greater than a BER threshold value. If the BER does not exceed the BER threshold value in block 270, the less complex detector 210 is adequate for detecting the received signal, and the method continues to block 275 where the received signal is detected using the less complex detector 210. However, the BER being greater than a BER threshold value indicates to the controller 235 that the less complex detector 210 is not adequate to detect the received signal. The controller 235 then actuates switch 240 to remove power from the less complex detector 210 and to apply power to the more complex detector 215. The method then continues to block 280 where the more complex detector 215 synchronizes to the buffered signal, and the more complex detector 215 then detects the buffered signal as shown in block 285.

Since known fields of the slot are used to estimate BER, no error correction decoding need be performed during the detector selection as the known fields are not error correction encoded.

In one embodiment, the known symbols include the synchronization sequence of synchronization field 135. In a further, embodiment, the known symbols comprise the synchronization sequences from neighboring time slots, for example time slots 120 and 130 as well. This is possible due to the repetitive nature of the TDMA block and the ability of the mobile station, after being assigned a SYNCWORD, to determine the SYNCWORD for neighboring time slots in the transmitted signal. In an alternative embodiment, the known symbols may include symbols in the CDVCC field 150, or a combination of the synchronization sequence and the CDVCC. In an additional alternative embodiment, where the signal is transmitted over a control channel, the known symbols include a coded super-frame phase (CSFP) field.

The BER threshold may be determined by multiplying an allowable BER for a time slot by the percentage of the time slot represented by the known symbols. For example, if the allowable BER is 30 bit errors for a complete time slot, and the known symbols represent 10% of the time slot, the BER threshold is: 30×(0.1)=3. A "margin of error" may be added to the BER threshold.

Using the synchronization sequences of neighboring time slots, or known symbols from other fields within the time slot in addition to the synchronization sequence increases the accuracy of the detector selection where the channel conditions during the synchronization sequence of the time slot are different than for the remainder of the time slot. For example, where the channel is flat during the synchronization sequence but is in deep fade during the remainder of the time slot, the BER for the synchronization sequence indicates that the less complex detection method is adequate to detect the signal. However, where the synchronization sequences of neighboring slots, or known symbols from other fields within the current time slot are used in addition to the synchronization sequence of the current time slot, the BER accounts for the deep fade occurring over the remainder of the time slot as a greater number of known symbols are affected by the deep fade. This causes the BER being greater than the BER threshold and results in the more complex detector to be selected to detect the signal.

An alternative way of increasing the accuracy of the detector selection method is to use a running BER windowed over a plurality of time slots in place of the BER described above. The equation for the running BER is:

$$\text{cumulative}_k = (\alpha)\text{cumulative}_{k-1} + (1-\alpha)BER_k.$$

Cumulative$_k$ is the cumulative measure for the K$_{th}$ slot for the window, BER$_k$ is the measured BER of the K$_{th}$ slot, and α is a smoothing factor close to, but less than 1. The use of a running BER prevents the signal detector selector from switching to the more complex detector where channel conditions warranting use of the more complex detector occur for just a small number of time slots.

A receiver utilizing the signal detector selector consumes less power than known detector selectors as the signal detector selector selects the detector by detecting only the known symbols present in the received signal. Further, reduced power consumption is achieved as the detector selection may occur without performing error correction decoding on the received signal. This is possible because the known fields of data, such as the synchronization sequence 135 and the CDVCC field 150 are established at the beginning of a transmission, and do not change from slot to slot during the course of the transmission, and therefore need not be error correction decoded to determine the BER.

Figure 4:
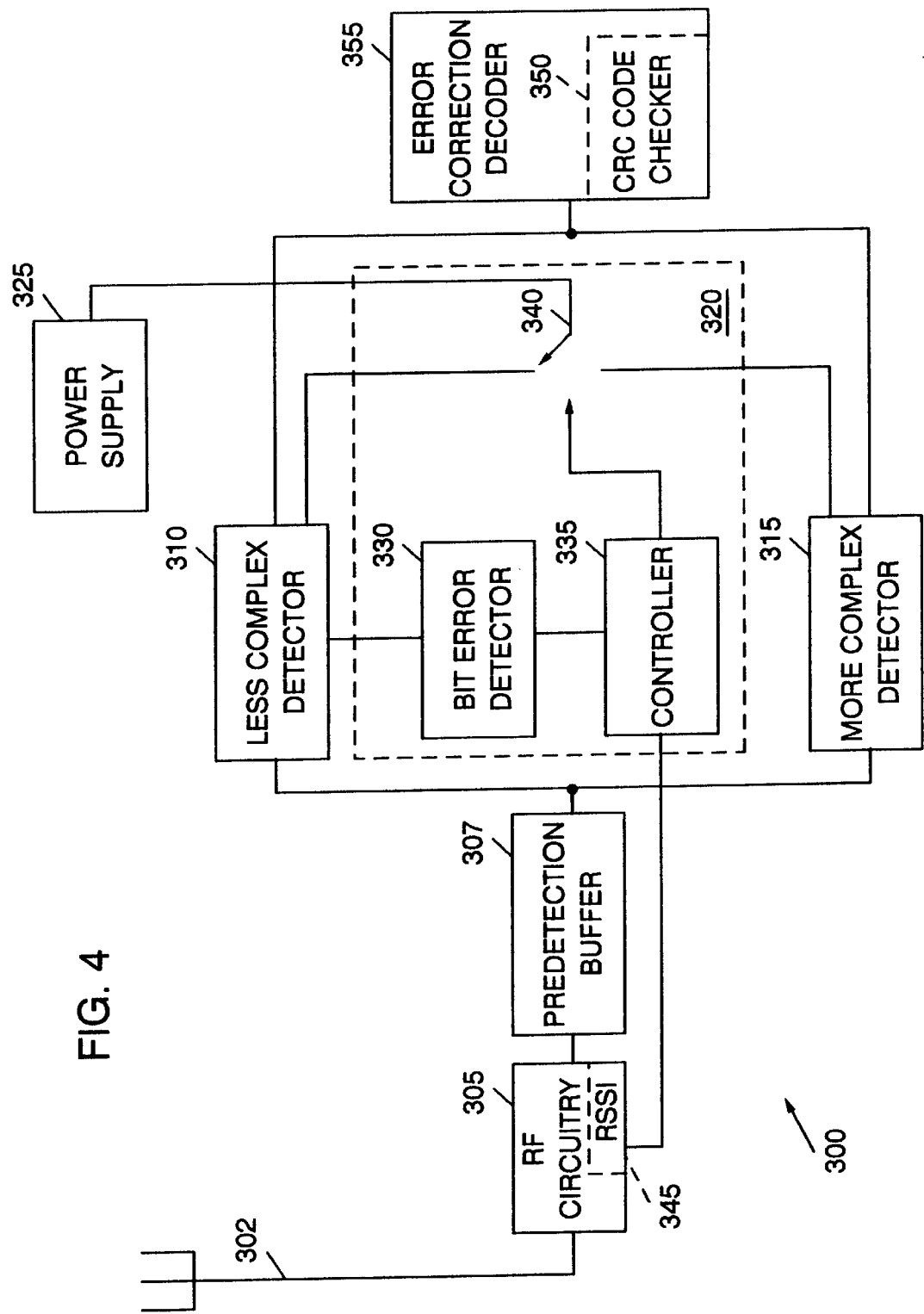
FIG. 4 is a block diagram illustrating a further embodiment of a signal detector selector with power applied to either a first detector or a second detector.

A further embodiment of a receiver utilizing the signal detector selector is shown in FIG. 4. Components of FIG. 4 which are counterparts of components of FIG. 2 are identified by reference numerals incremented by 100 and a detailed description will not be repeated. A less complex detector 310 for detecting the signal is coupled to the signal detector selector 320 and to an error correction decoder 355. A more complex detector 315 is coupled to the signal detector selector 320 and the error correction decoder 355 and detects the buffered signal where a BER for the less complex detector 310 exceeds a BER threshold. The error correction decoder 355 decodes the detected signal. The RF circuitry 305 further includes an RSSI circuit 345 for determining the received signal strength of the received signal. Error correction decoder 355 further includes a CRC code checker 350. The CRC code checker 350 performs a CRC code check on the decoded signal. Operation of receiver 300 will be described with reference to the flow charts of FIGS. 5–7.

Figure 5B:
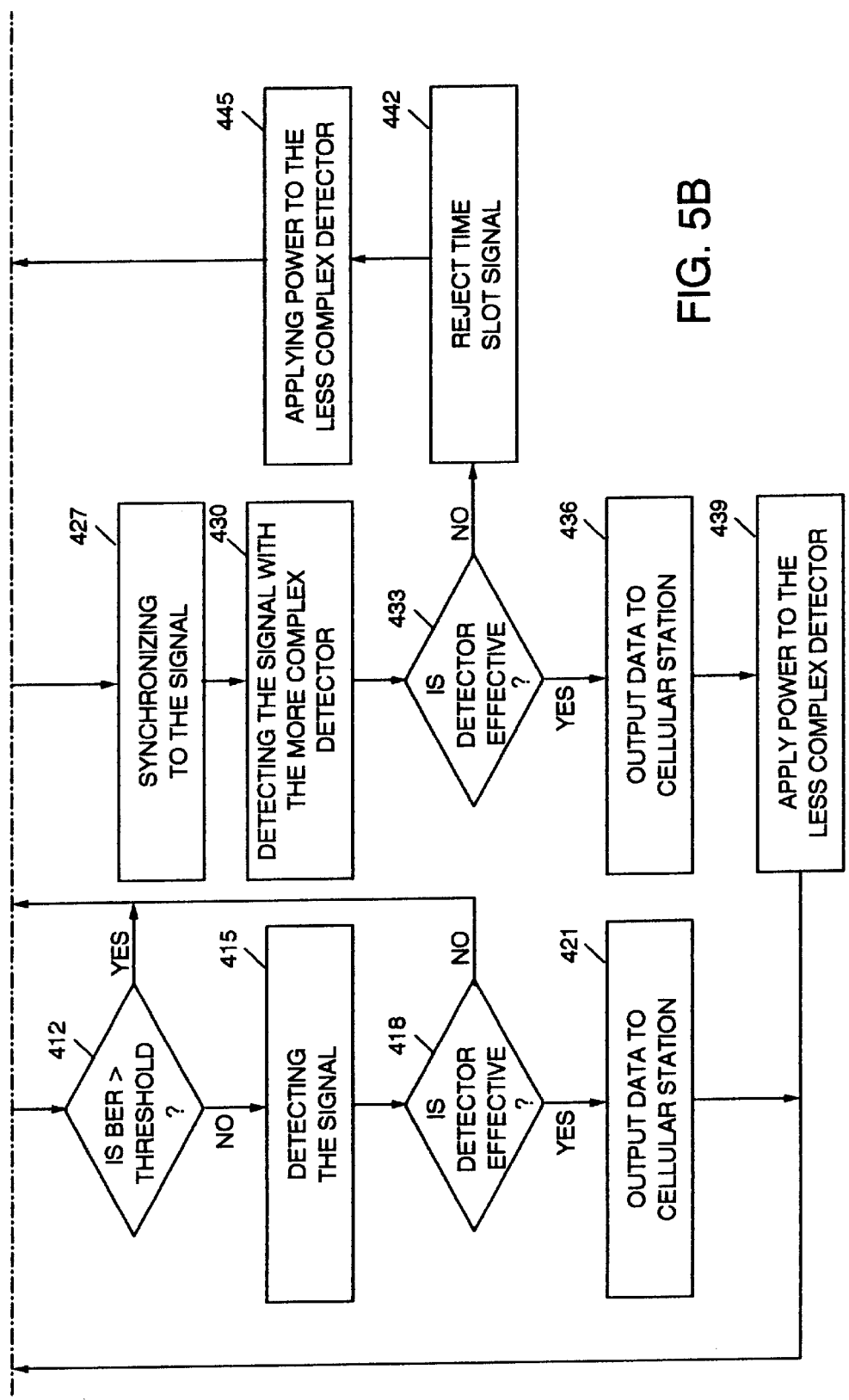
FIGS. 5, 6 and 7 are flow charts illustrating different aspects of the operation of the signal detector selector of FIG. 4.

A flow chart illustrating operation of a receiver 300 utilizing the signal detector selector of FIG. 4 which has capabilities for determining effectiveness of the detector in use is shown in FIG. 5. FIG. 5 begins at block 400 where the next time slot signal is received by antenna 302, and RF circuitry 305 filters, downconverts and amplifies the signal for further processing. The predetection buffer 307 stores the received time slot signal, block 401. If the signal is transmitted over a control channel, the signal is buffered by storing a single time slot in the buffer 307, and if the signal is transmitted over a traffic channel, the signal is buffered by storing two time slots in the buffer 307.

The less complex detector 310 then synchronizes to the signal as shown in block 405. In block 406, the less complex detector 310 detects known symbols in the received signal. The known symbols may be as discussed above in relation to FIG. 3. In block 409, a BER is determined for the known symbols. This block is performed in the same manner as block 265 of FIG. 3 and will not be discussed in further detail. The controller 335 determines if the BER is greater than a BER threshold value, shown in block 412. If it is determined that the BER is not greater than the BER threshold value, then the signal is detected by less complex detector 310 as shown in block 415.

In block 418, it is determined whether the detection of the time slot signal is effective. One way of making this determination is by using the CRC code encoded into the received signal. The error correction decoder 355 decodes the detected signal and the CRC code checker 350 determines whether the received signal was detected and error correction decoded accurately. If the CRC code checks, the less complex detector is determined to be effective. However, if the CRC code does not check, the less complex detector is determined to be ineffective.

If the less complex detector 310 is determined to be effective in block 418, the method continues to block 421 where the detected data is output to the remainder of the mobile cellular station (not shown) for further processing and the method then returns to block 400 where the next time slot signal is received. However, if the less complex detector 310 is determined to be ineffective in block 418, or if the BER is greater than a threshold value in block 412, the controller 335 actuates switch 340 to remove power from the less complex detector 310, and to connect the power supply 325 to the more complex detector 315, as shown in block 424.

In block 427, the more complex detector 315 synchronizes to the signal using the buffered signal stored in predetection buffer 307. The more complex detector 315 detects the signal as shown in block 430. In block 433, it is determined whether the more complex detector 315 is effective. This block may be performed using the CRC code or the running BER as described above for block 418. If it is determined that the more complex detector is effective, the method proceeds to block 436 where the detected information is output to the remainder of the cellular station for further processing. The method then continues to block 439 where the controller 335 actuates switch 340 to remove power from the more complex detector 315 and apply the power from power supply 325 to less complex detector 310, and the method returns to block 400 where the next time slot signal is received. However, if it is determined that the more complex detector 315 is not effective in block 433, the method continues to block 442 where the time slot signal is rejected. The method then continues to block 445 where power is applied to the less complex detector in the manner described for block 439, and the method then returns to block 400 where the next time slot signal is received.

Where a CRC code is not encoded into the signal, determining an effectiveness of the less complex detector may be built-in to block 412 by using the running BER described above with respect to FIG. 2. If the running BER does not exceed a running BER threshold in block 412, the less complex detector is determined to be effective to continue detecting the signal, and the method proceeds from block 415 to block 421, skipping block 418. Thus, the error correction decoder 355 need not process the signal, but rather passes the signal on for further processing by the cellular station. If the running BER exceeds the running BER threshold in block 412, the more complex detector 315 synchronizes to and detects the current time slot signal from the buffer 307, blocks 427 and 430, as discussed above. Alternatively, the more complex detector synchronizes to and detects the next time slot signal in blocks 427 and 430.

Where effectiveness of a detector is to be determined for a traffic channel, detected error correction coded bits must be stored over two slot receptions. This is necessary as the data in the digital traffic channel is interleaved over two time slots, requiring two time slots of data to be processed to determine if the CRC code checks. The predetection buffer 307 may contain one or more slots worth of received signal samples, depending on the detection method used.

Having a receiver with a signal detector selector capable of determining an effectiveness of the detector is advantageous as minimized power is consumed in the detector selection process, and a more complex detector detects the signal where the less complex detector is determined to be ineffective, thereby preventing immediate rejection of the time slot signal based on the detection by the less complex detector.

Figure 6B:
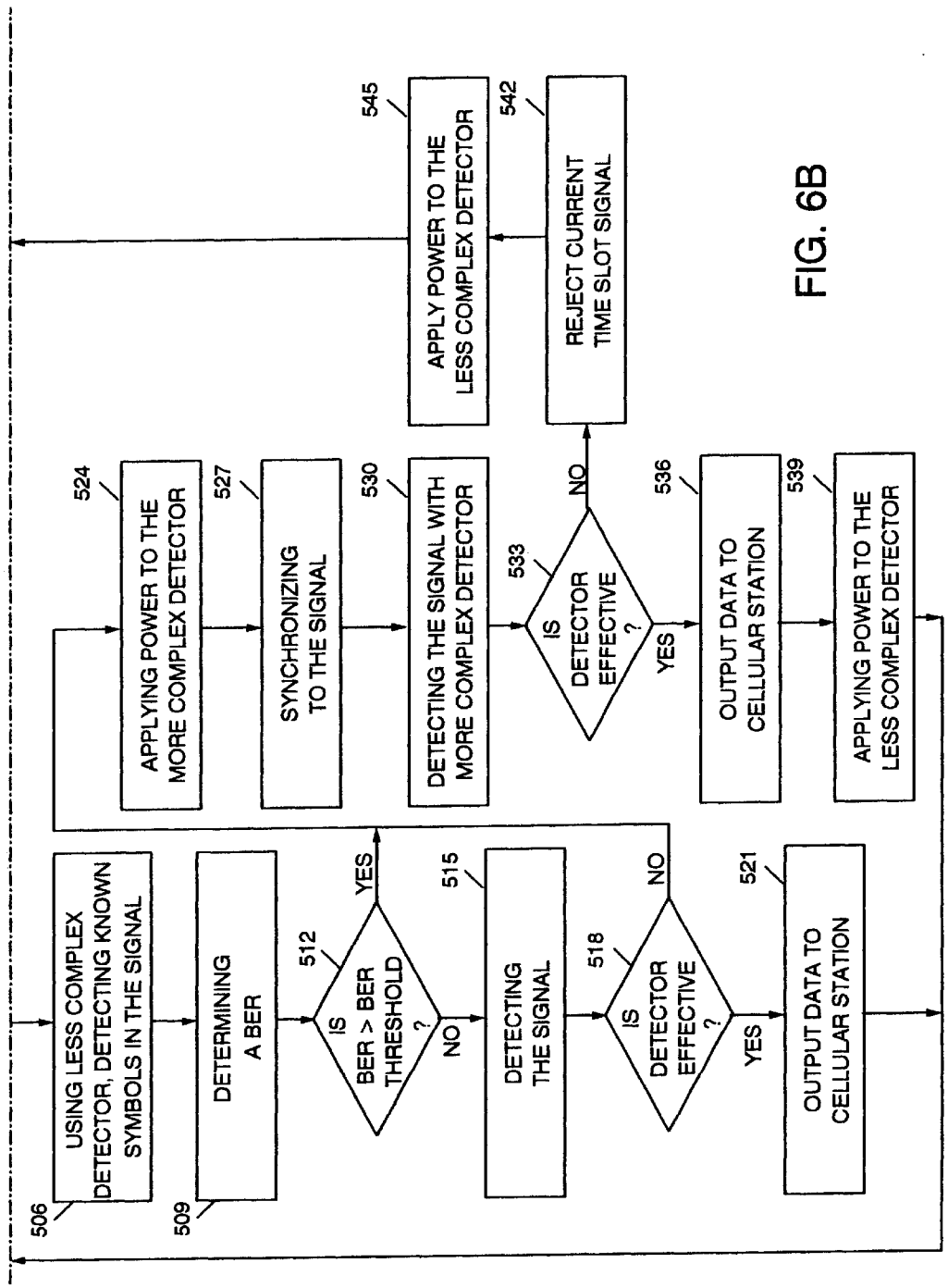

A flow chart illustrating the operation of the receiver 300 making the detector selection using a received signal strength (RSS) is shown in FIG. 6. Blocks of FIG. 6 which are counterparts of blocks of FIG. 5 are identified by reference numerals incremented by 100 and will not be discussed in great detail.

FIG. 6 begins in block 500 where a time slot signal is received. The method continues to block 501 where the received signal is stored into a predetection buffer 307. In block 502, an RSS is determined for the received signal. This determination is made by the RSSI circuit 345 in the RF circuitry 305. The method then continues to block 503 where it is determined whether the RSS is greater than an RSS threshold value. This determination may be made by the controller 335, or by any other controller present in the cellular station. If the RSS is determined not to be greater than the RSS threshold value, the current time slot signal is rejected, block 504, and the next time slot signal is received as shown in block 500. The RSS threshold is set to a value that if the RSS does not exceed the RSS threshold, any detector present in the cellular station would be unable to detect the time slot signal. Such an RSS threshold value may be determined experimentally, or by using each detector manufacturer specification. If the RSS is determined to be greater than the RSS threshold value in block 503, the method continues to block 505 where less complex detector 310 synchronizes to the signal.

The less complex detector 310 detects known symbols in the received signal as shown in block 506. In block 509, a BER is determined for the detected known symbols. The method then continues to block 512 where it is determined whether the BER is greater than a BER threshold. If the BER is not greater than a BER threshold, the received signal is detected with the less complex detector, block 515. In block 518, it is determined whether the less complex detector is effective wherein if the less complex detector is determined to be effective, the detected data is output to the remainder of the cellular station for further processing, as shown in block 521. The next time slot signal is received, block 500.

However, if the BER is determined to be greater than a BER threshold in block 512, or the less complex detector 310 is determined not to be effective in block 518, power from power supply 325 is applied to the more complex detector 315, shown in block 524. The more complex detector 315 synchronizes to the received signal, block 527. In block 530, the received signal is detected with the more complex detector 315. It is then determined whether the more complex detector 315 is effective in block 533. If it is determined that the more complex detector 315 is effective, the detected data is output to the remainder of the cellular station for further processing, block 536. Power is then applied to the less complex detector 310 in block 539 and the next time slot signal is received, block 500. However, if it is determined that the more complex detector 315 is not effective in block 533, the current time slot signal is rejected as shown in block 542. Power is applied to the less complex detector 310, block 545, and the next time slot signal is received, block 500.

Where the receiver utilizing a signal detector selector uses an RSS to determine whether to detect the signal at all, power consumption is reduced as no detection method is attempted on the received signal where the RSS is too small for detection by any detector.

Figure 7B:
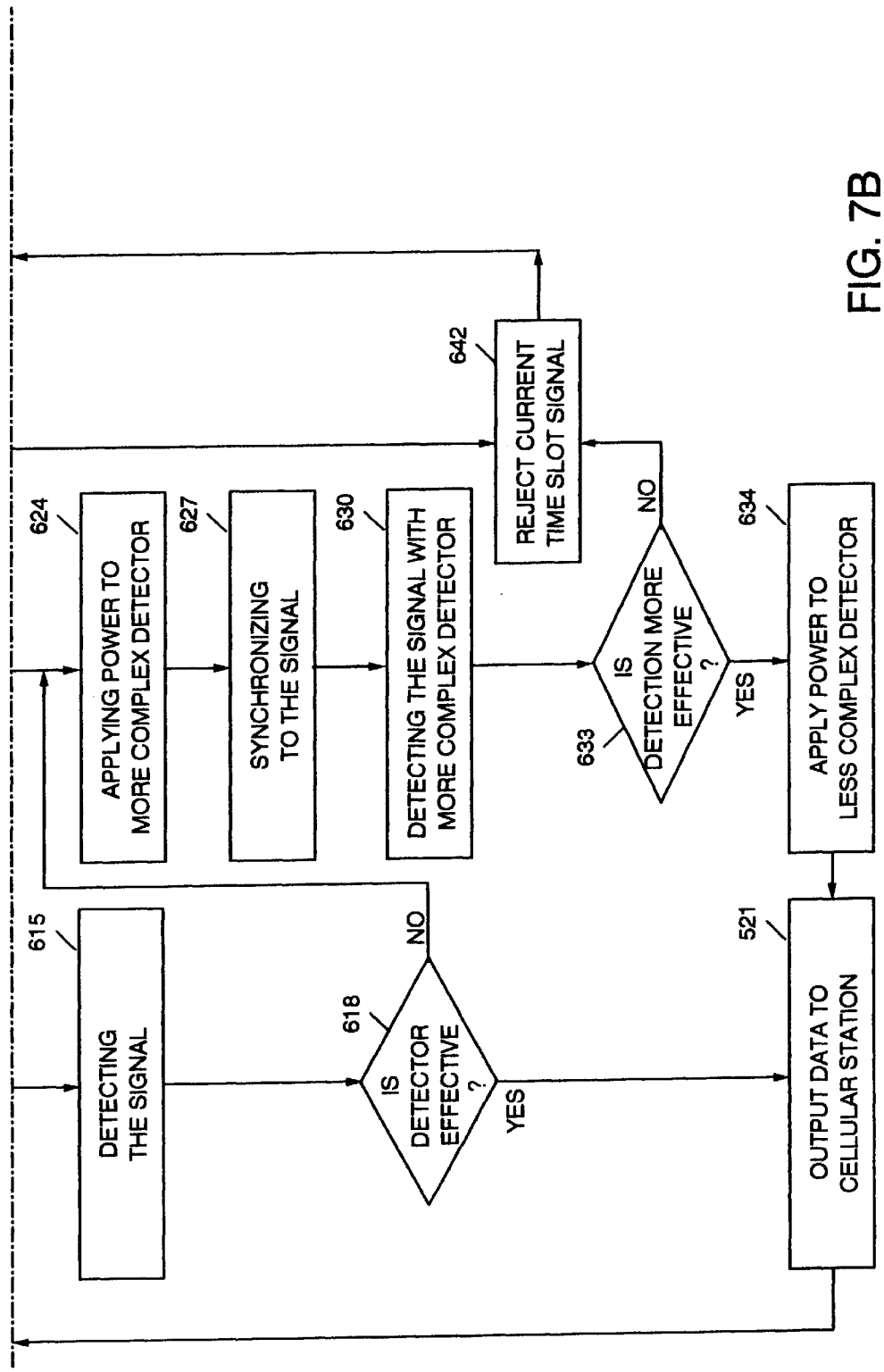

A flow chart illustrating operation of a receiver utilizing a signal detector selector wherein a combination of a BER and a RSS is used for detector selection is shown in FIG. 7. Blocks of FIG. 7 which are counterparts to blocks of FIG. 5 are identified by reference numerals incremented by 200 and will not be discussed in great detail.

The time slot signal is received as shown in block 600. The received signal is stored in the predetection buffer 307, block 601. The less complex detector 310 synchronizes to the signal as shown in block 605. In block 606, the less complex detector 310 detects the known symbols in the received signal. A BER is determined for the known symbols in the received signal as shown in block 609. In block 612, it is determined whether the BER is greater than a BER threshold. If it is determined that the BER is not greater than a BER threshold, the method continues to block 615 where less complex detector 310 detects the received signal. In block 618, it is determined whether the less complex detector is effective. If it is determined that the less complex detector is effective, the detected data is output to the remainder of the cellular station for further processing, block 621, and the next time slot signal is received as shown in block 600.

In block 612, if the BER is determined to be greater than the BER threshold, an RSS is determined for the received signal, block 613. It is determined in block 614 whether the RSS is greater than an RSS threshold. Blocks 613 and 614 may be performed in a manner similar to blocks 502 and 503 of FIG. 6. If it is determined that the RSS is not greater than an RSS threshold, the current time slot signal is rejected as shown in block 642. Power is applied to the less complex detector 310, block 645, and the next time slot signal is received, block 600. However, if it is determined that the RSS is greater than an RSS threshold in block 614, or that the less complex detector is not effective in block 618, power is applied to the more complex detector 315, as shown in block 624. The more complex detector 315 synchronizes to the received signal, block 627, and in block 630 the received signal is detected using the more complex detector 315. In block 633, it is determined whether the more complex detector 315 is effective. If it is determined that the more complex detector is not effective, the method continues to block 642 and proceeds as previously stated. However, if it is determined that the more complex detector is effective, the method proceeds to block 634 where power is applied to the less complex detector 310, and then to block 621 and operates as previously stated.

Utilizing a receiver having a signal detector selector which uses the BER and the RSS to select a detector is advantageous as battery power is conserved as use of the more complex detector is avoided where the BER for the known symbols is greater than the BER threshold and the RSS is below the RSS threshold.

Figure 8:
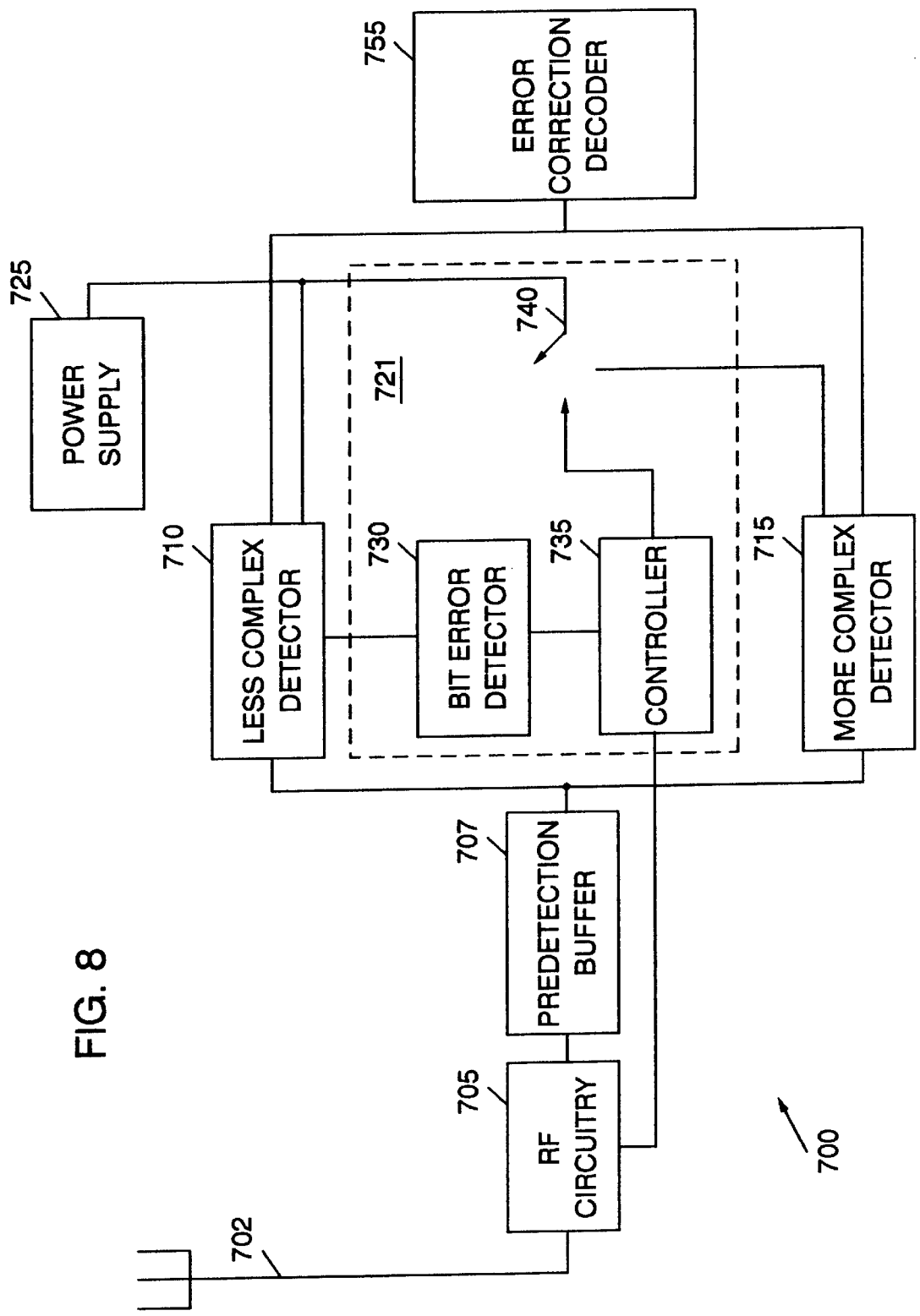
FIG. 8 is a block diagram illustrating a signal detector selector where power is applied and removed only from the second detector.
Figure 9B:
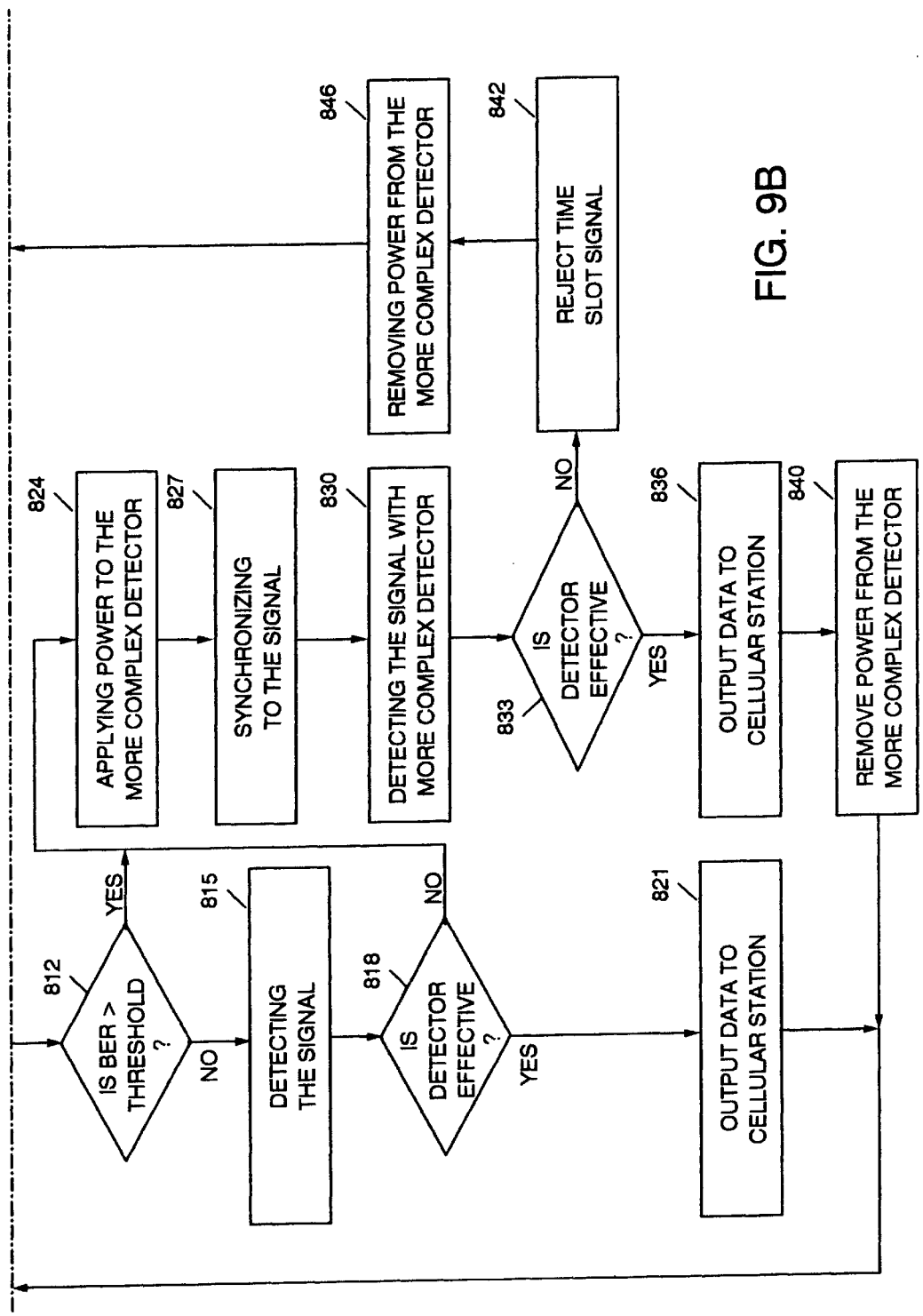
FIG. 9 is a flow chart illustrating operation of the signal detector selector of FIG. 8.

A receiver utilizing a single detector selector where power is always applied to the less complex detector is shown in FIG. 8 Components of FIG. 8 which are counterparts of components of FIG. 4 are identified by reference numerals incremented by 400 and will not be described in great detail. FIG. 8 is different from FIG. 4 as the less complex detector 710 is always coupled to the power supply 725. Further, the switch 740 of circuitry 721 only controls power for the more complex detector 715, unlike the switch 340 of FIG. 4 which controls power for both the less complex detector 310 and the more complex detector 315. Operation of the detector selector of FIG. 8 will be explained in reference to the flow chart of FIG. 9.

In block 800, a time slot signal is received. The predetection buffer 707 buffers the received signal in block 801. In block 805, the less complex detector 710 synchronizes to the received signal. The less complex detector 710 detects known symbols in the received signal, block 806, and the bit error detector 730 determines a BER for the known symbols as shown in block 809.

In block 812, it is determined whether the BER is greater than a BER threshold. If the BER is not greater than a BER threshold, the method continues to block 815 where the signal is detected by less complex detector 710. It is then determined in block 818 whether the less complex detector is effective. If the less complex detector is determined to be effective, the detected data is output to the remainder of the cellular station for further processing, block 821, and the next time slot signal is received as shown in block 800. However, if the BER is determined to be greater than the BER threshold in block 812, or the less complex detector is determined not to be effective in block 818, power is applied to the more complex detector 715, block 824. The more complex detector 715 synchronizes to the received signal as shown in block 827. In block 830, the more complex detector 715 detects the received signal.

It is determined in block 833 whether the more complex detector 715 is effective. If it is determined that the more complex detector is effective, the method proceeds to block 836 where the detected data is output to the remainder of the cellular station for further processing. Power is then disconnected from the more complex detector 715 as shown in block 840. This block is carried out by the controller 735 causing the switch 740 to actuate, thereby disconnecting the power supply 725 from the more complex detector 715. The next time slot signal is received as shown in block 800. If however, it is determined that the more complex detector is not effective in block 833, the current time slot signal is rejected as shown in block 842. In block 846, power is disconnected from the more complex detector 715 in the same manner as described in reference to block 840. The method then returns to block 800.

In a further embodiment not shown, an RSS or a combination of the RSS and the BER could be used to select the detection method, as described in relation to FIGS. 6 and 7, supra.

Although the less complex detector 710 is powered all the time, the less complex detector 710 consumes but a fraction of the power (approximately 1/15 th the power) consumed by the more complex detector 715. Therefore, since selection of the detector is accomplished with minimal use of the more complex detector 715, and without use of the error correction decoder 755, reduced power consumption is achieved over that of known signal detector selectors.

Figure 10:
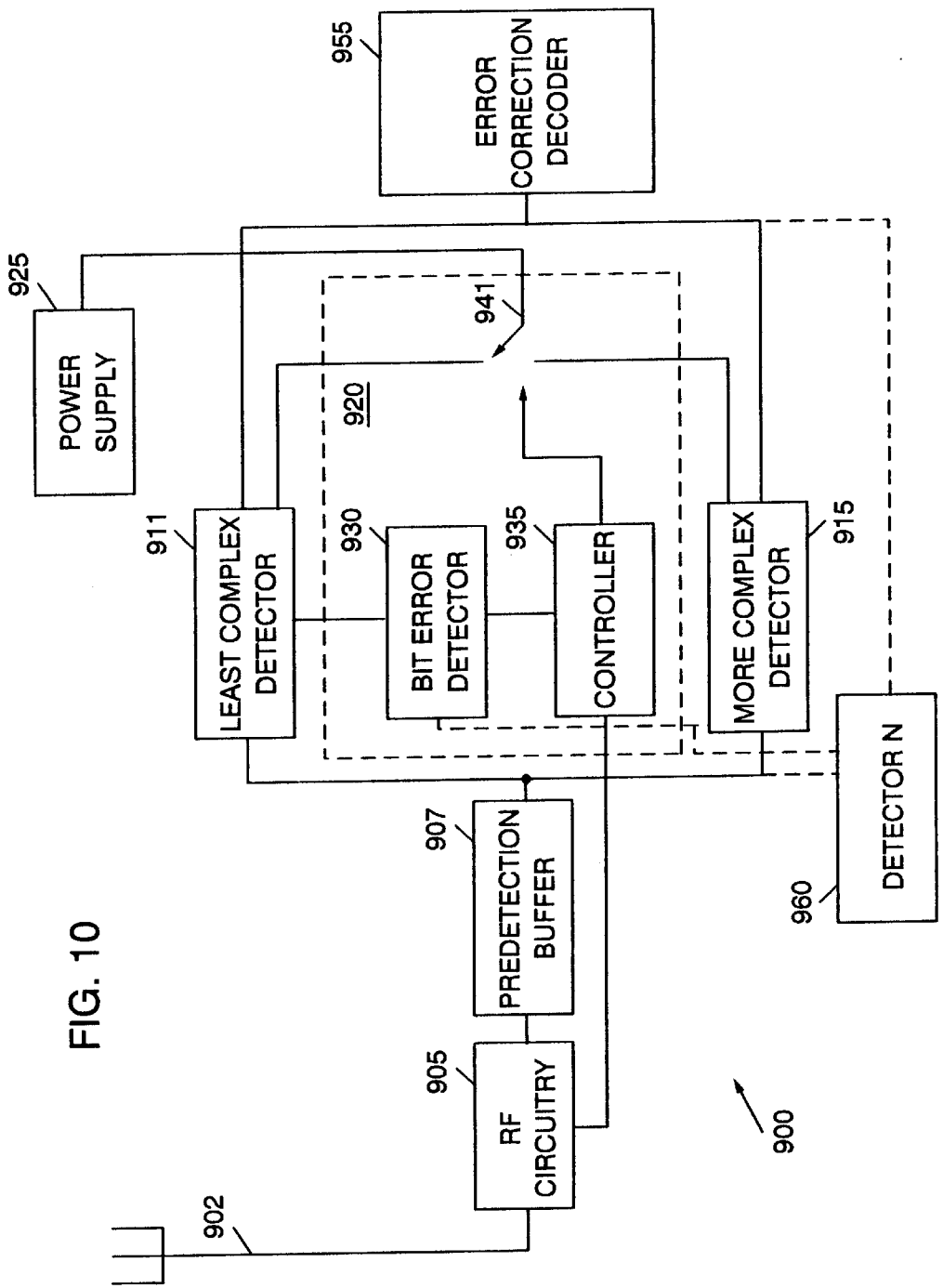
FIG. 10 is a block diagram illustrating a signal detector selector for selecting among three or more detectors.

A receiver utilizing a signal detector selector capable of selecting among three or more detectors is shown in FIG. 10. Components of FIG. 10 which are counterparts of components of FIG. 4 are identified by reference numerals incremented by 600 and will not be discussed in greater detail. The detector selector of FIG. 10 includes a least complex detector 911 and a plurality of N detectors 960 coupled to buffer 907 and to switch 941, where N represents any number of detectors. Each detector represented in FIG. 10 has a coupling point to switch 941 for connection to the power supply 925. The detectors 1 through N are arranged in order of increasing complexity and power consumption. Operation of the detector selector of FIG. 10 will be described in reference to the flow chart of FIG. 11.

Figure 11B:
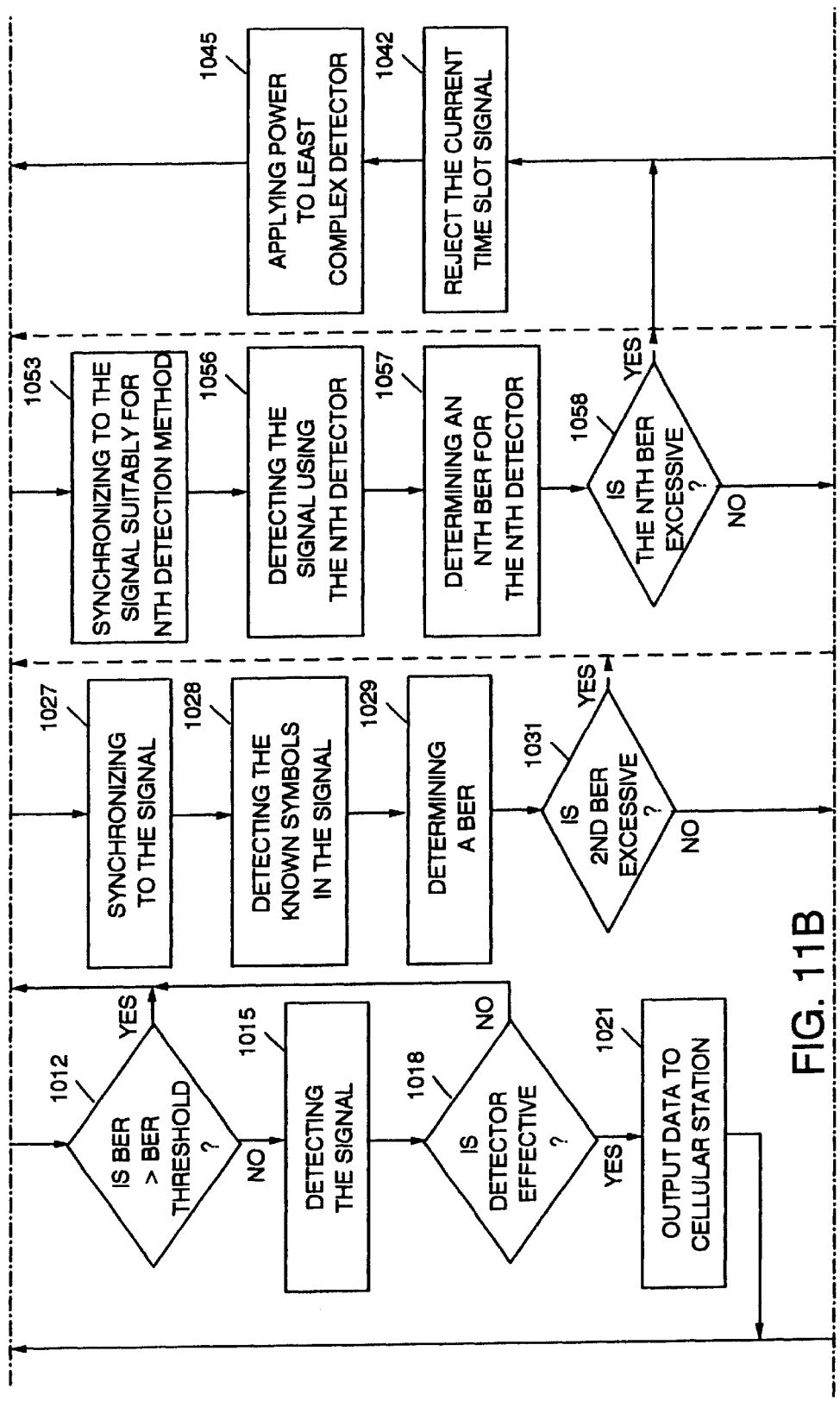
FIG. 11 is a flow chart illustrating the steps carried out by the signal detector of FIG. 10.
Figure 11C:
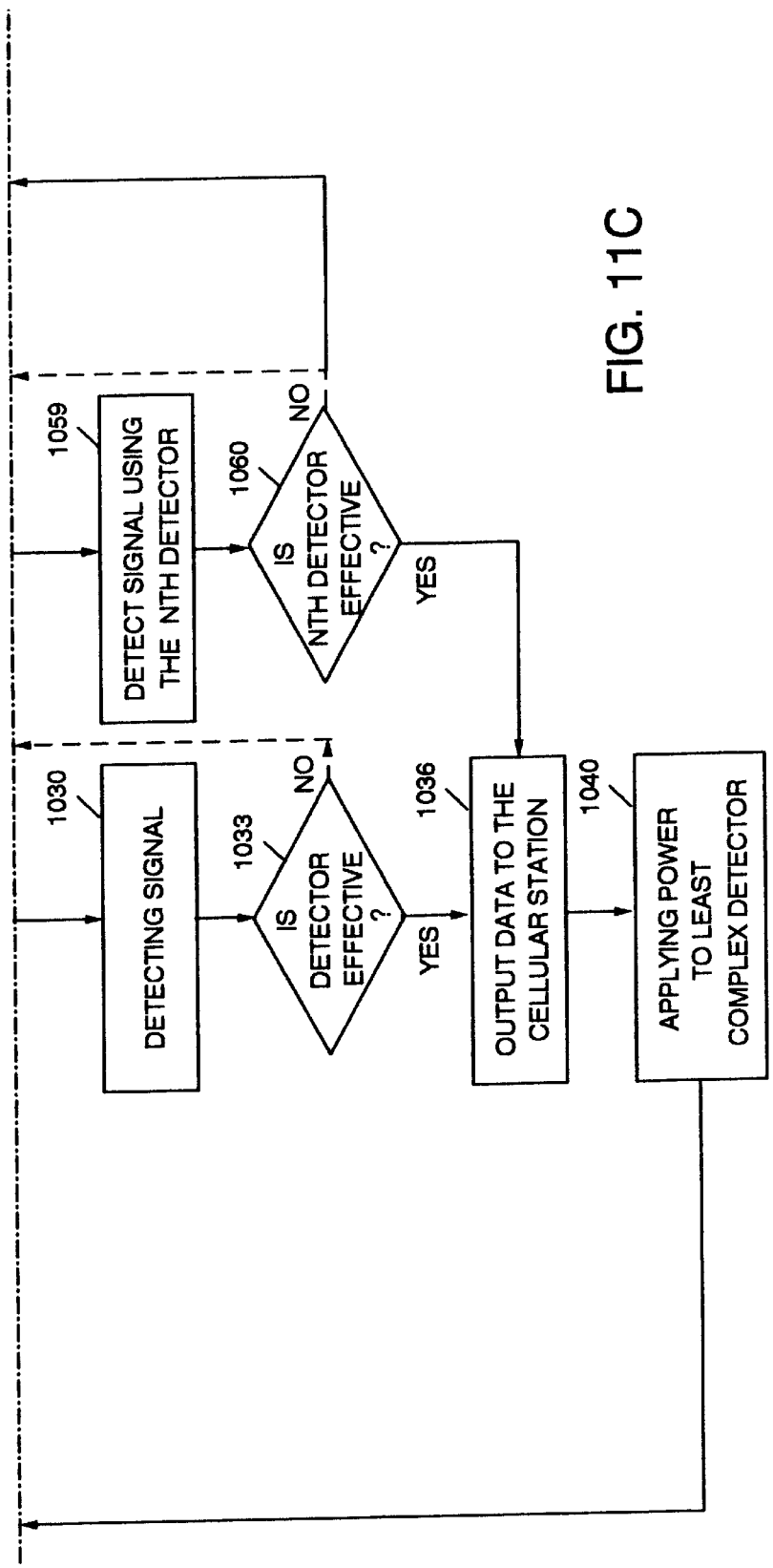

Blocks in FIG. 11 which are counterparts to blocks in FIG. 5 are identified by reference numerals incremented by 600 and will not be discussed in great detail.

In block 1000 the time slot signal is received. The signal is stored into the predetection buffer 907, block 1001. In block 1005, the least complex detector 911 synchronizes to the received signal. The least complex detector 911 detects the known symbols in the received signal as shown in block 1006. The method continues to block 1009 where a BER for the known symbols is determined. In block 1012, it is determined whether the BER is greater than a BER threshold. If it is determined that the BER is not greater than a BER threshold, the signal is detected by the least complex detector 911, shown in block 1015. It is determined whether the least complex detector is effective in block 1018. If it is determined that the least complex detector is effective, the detected data is output to the remainder of the cellular station for further processing, block 1021, and the next time slot signal is received as shown in block 1000. However, if it is determined that the BER is greater than the BER threshold in block 1012, or the least complex detector is not effective in block 1018, the method continues to block 1024.

In block 1024, power is applied to the more complex detector 915 the more complex detector 915 synchronizes to the received signal, block 1027, and detects the known symbols in the received signal, as shown in block 1028. Block 1028 is performed similar to block 1006, except that the more complex 915 is performing the detection. In block 1029, a second BER is determined for the detected symbols in the same manner as the BER is determined in block 1009. It is determined in block 1031 whether the second BER is excessive. This determination may be made by comparing the second BER to a second BER threshold, where the second BER threshold is determined experimentally or by using the manufacturers specifications for the more complex detector 915. If it is determined that the second BER is not excessive, the method continues to block 1030 where the more complex detector 915 detects the received signal. In block 1033, it is determined whether the more complex detector 915 is effective. If it is determined that the more complex detector 915 is effective, the detected data is output to the remainder of the cellular station for further processing, block 1036, and power is applied to the least complex detector 911 as shown in block 1040. This block is accomplished by the controller 935 actuating switch 941 to the switch position corresponding to the least complex detector 911. The next time slot signal is received as shown in block 1000. However, if it is determined that the second BER is excessive in block 1031, or that the more complex detector is not effective in block 1033, the method continues to block 1050.

In blocks 1050–1060, more complex detectors 960 present in the cellular station are continually selected until a detector yielding an adequate BER is found. Blocks 1050–1060 are performed in a similar manner as blocks 1024–1033, where successively complex detectors detect the signal, and will not be discussed. If the Nth, most complex detector is tried and no adequate BER has been found, then none of the N detectors is determined to be effective and the method continues to block 1042 where the current time slot signal is rejected. Power is applied to the least complex detector 911, block 1045, and the next time slot signal is received as shown in block 1000.

An RSS, or a combination of RSS and BER as described in FIGS. 6 and 7, may be used in addition to the embodiment of FIG. 11. Further, the least complex detector 911 may be always coupled to power supply 925 as described in relation to FIG. 9. There may be any number N of detectors present within the receiver.

Figure 12:
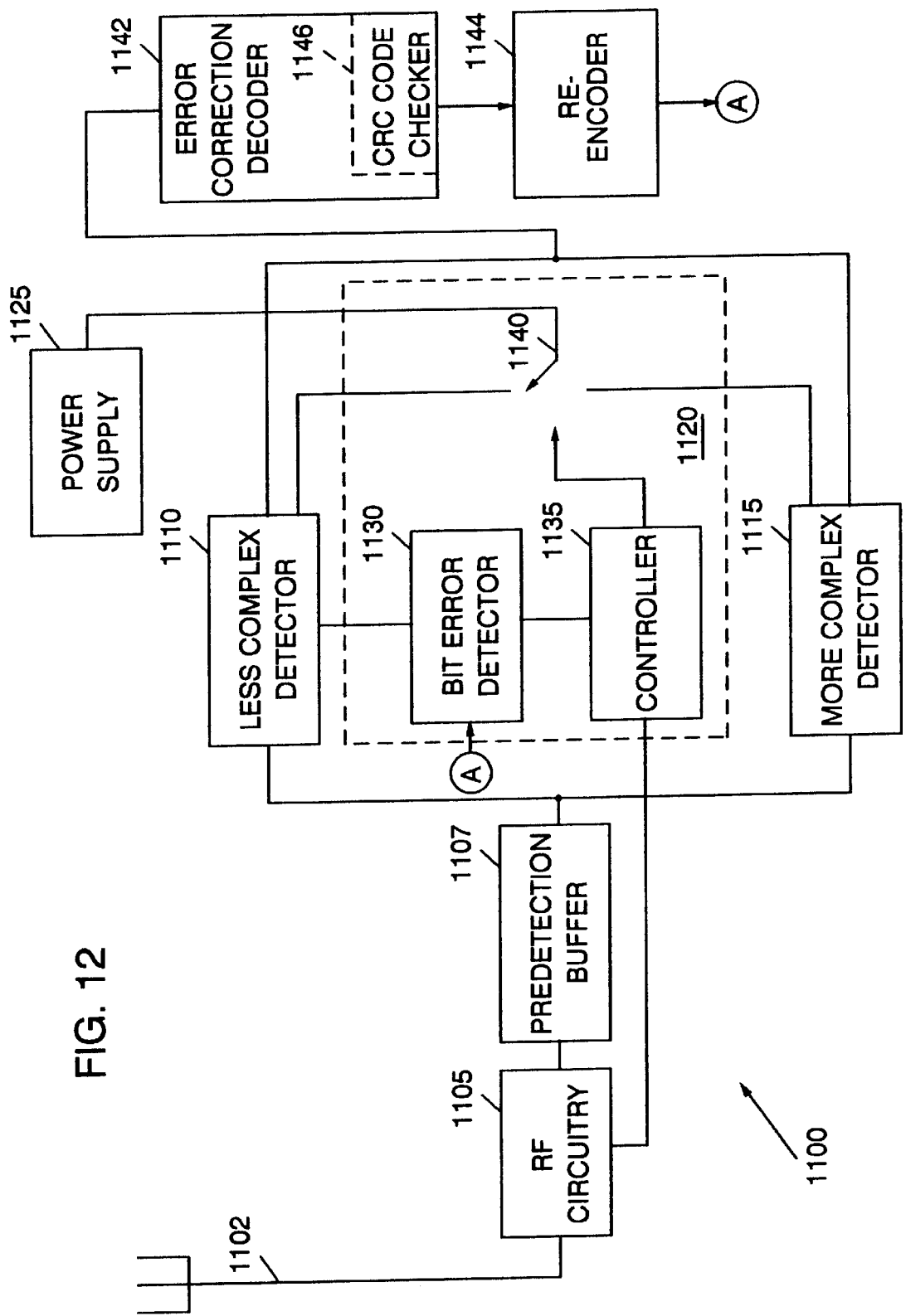
FIG. 12 is a block diagram illustrating the signal detector selector of FIG. 2 which generates assured symbols.

A block diagram illustrating a receiver having a signal detector selector capable of generating assured symbols is illustrated in FIG. 12. The assured symbols are used as known symbols for a BER determination. Components of FIG. 12 which are counterparts to components of FIG. 2 are identified by reference numerals incremented by 900 and will not be discussed in greater detail. FIG. 12 further includes an error correction decoder 1142 coupled to the least complex detector 1110 and to the more complex detector 1115 for decoding and CRC code checking the detected signal. Error correction decoder 1142 is further coupled to reencoder 1144, which error correction reencodes the CRC code checked signal, and is coupled to bit error detector 1130. Error correction decoder 1142 includes a CRC code checker 1146. FIG. 12 is different than FIG. 2 as the error correction decoder 1142, the reencoder 1144, and the CRC code checker 1146 allow the receiver 1100 to generate assured symbols of data, the process of which will be discussed in relation to the flow chart of FIG. 13.

Figure 3:
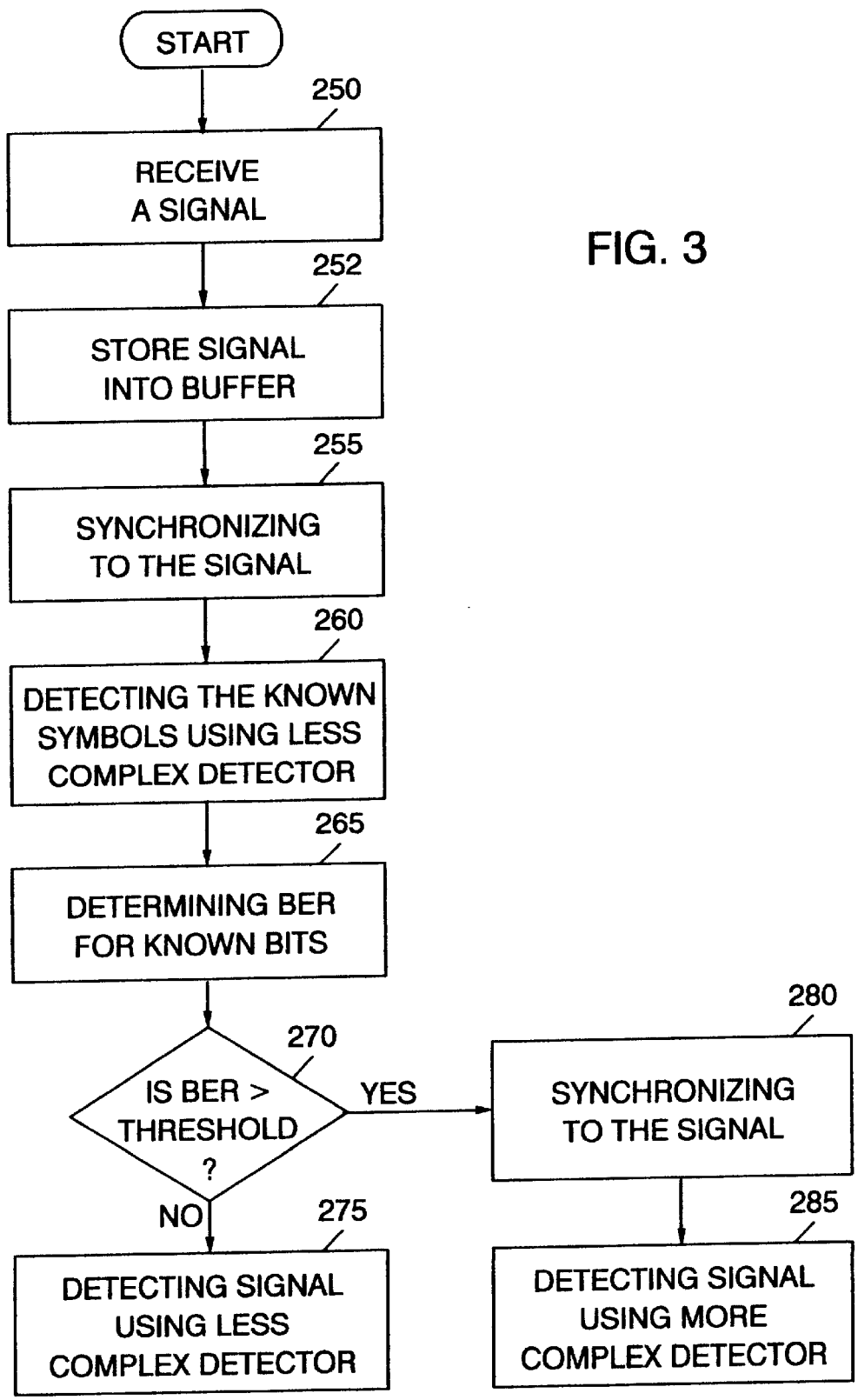
FIG. 3 is a flow chart illustrating the operation of the signal detector of FIG. 2.
Figure 13:
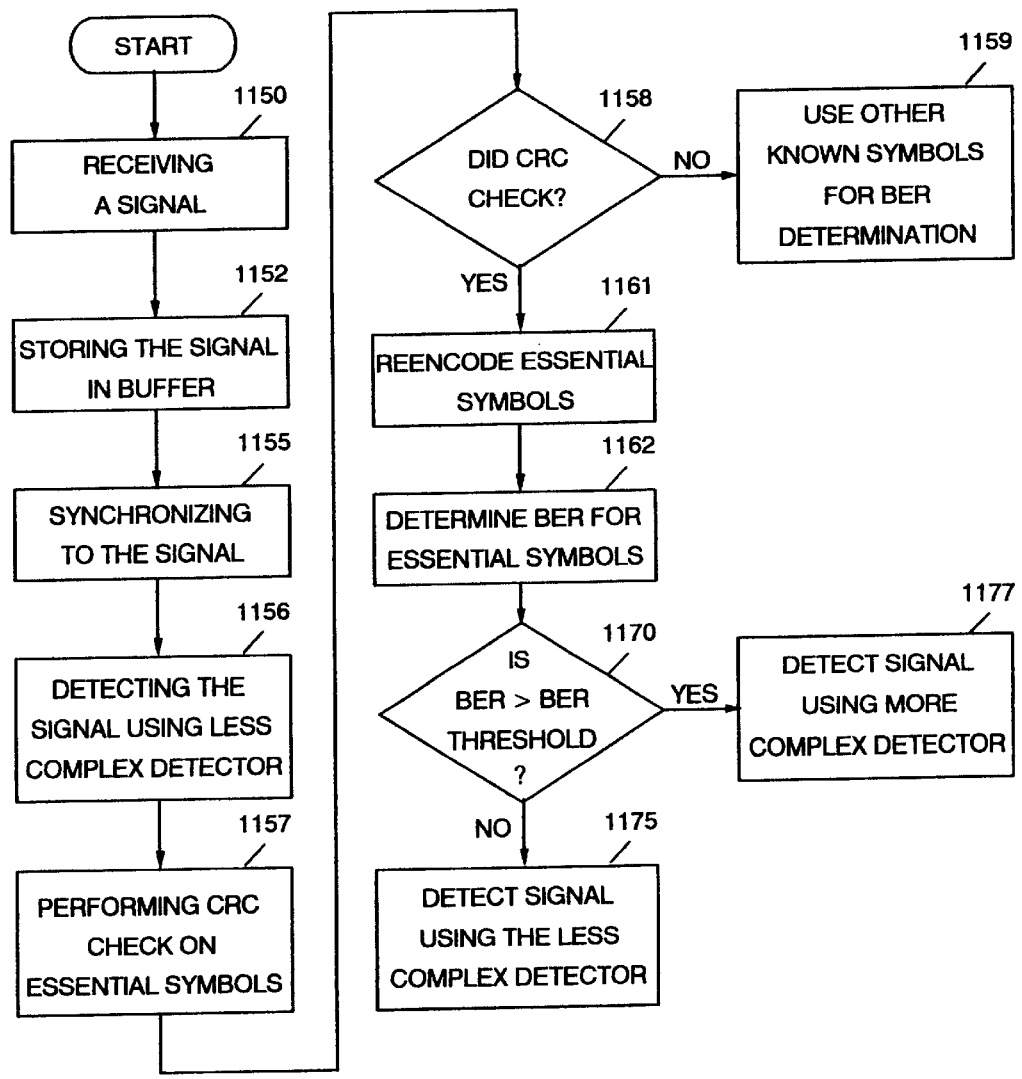
FIG. 13 is a flow chart illustrating the steps carried out by the signal detector selector of FIG. 12.

Blocks of FIG. 13 having counterparts in FIG. 3 are identified by reference numerals incremented by 900 and will not be described in great detail.

In block 1150, a signal is received at the reception antenna 1102. The received signal is stored into the predetection buffer 1107 in block 1152. In block 1155, the less complex detector 1110 synchronizes to the received signal. The less complex detector 1110 detects the received signal as shown in block 1156. The method proceeds to block 1157 where a CRC code check is performed on essential symbols in the detected signal by the CRC code checker 1146. The essential symbols are those symbols vital to operation of the mobile station, as discussed with reference to FIG. 1. This block includes the detected symbols from less complex detector 1110 being error correction decoded by the error correction decoder 1142. The error correction decoder 1142 and the CRC checker 1146 know the location of the essential symbols in the detected signal.

In block 1158, it is determined whether the CRC code checked. If it is determined that the CRC code did not check, the method proceeds to block 1159 where other known symbols, for example, the SYNCWORD, are used for a BER determination. In an alternative embodiment (not shown), if the CRC code did not check in block 1158, the time slot signal is rejected.

If, however, the CRC did check in block 1158, the CRC code checked symbols are reencoded by reencoder 1144 as shown in block 1161. Reencoder 1144 accomplishes this by using the same error correction encoding algorithm used by the cellular station transmitting the signal. In this way, the essential symbols have become generated assured symbols. Since the probability that the CRC falsely indicates correct data is extremely low, these generated assured symbols may be considered known symbols.

In block 1162, a BER is determined by the bit error detector 1130 for the essential symbols. This block is performed by the less complex detector 1110 redetecting portions of the received signal from the predetection buffer 1107 corresponding to the essential symbol locations, and the bit error detector 1130 comparing these portions with the reencoded symbols to determine a bit error rate. If the BER is greater than a BER threshold in block 1170, the received signal is detected using a more complex detector 1115, block 1177. However, if the BER is not greater than the BER threshold in block 1170, the signal is detected using the less complex detector 1110, as shown in block 1175.

Because all the data in the time slot is CRC'd for a digital control channel, a receiver utilizing the signal detector selector capable of generating assured symbols gives an exact determination of the BER for the entire time slot, thereby allowing for a very accurate selection of detectors. For a digital traffic channel, where approximately one-half of the data in the time slot is CRC'd, the determination of the BER is also very accurate as the BER over the assured symbols represents one-half the time slot, thereby yielding a very accurate selection of detectors as well.

A block diagram illustrating a receiver having a signal detector selector for generating assured symbols is shown in FIG. 14. Components of FIG. 14 which are counterparts to components of FIG. 4 are identified by reference numerals incremented by 900 and will not be discussed in further detail. FIG. 14 further comprises a reencoder 1260 coupled to the error correction decoder 1255. Reencoder 1260 is further coupled to a reencoding buffer 1265 which stores the reencoded signal, and is coupled to the bit error detector 1230. FIG. 14 is different from FIG. 4 as the CRC code checker 1250 and the reencoder 1260 are used in the generation of assured symbols for use as known symbols. Further, once generated, the assured symbols are stored in the reencoding buffer 1265. Operation of the detector selector of FIG. 14 is described in relation to the flow chart of FIG. 15.

Figure 15B:
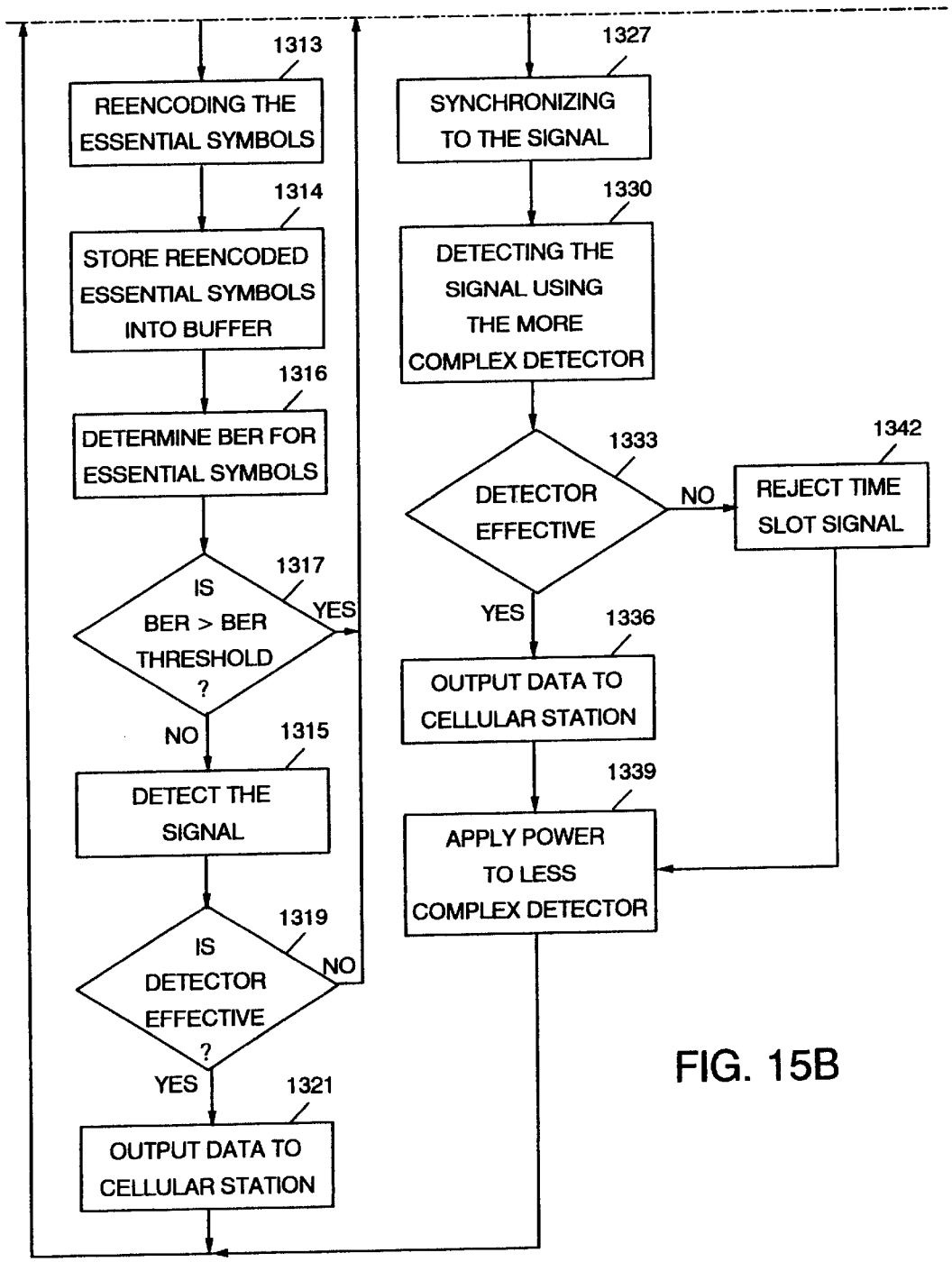
FIG. 15 is a flow chart illustrating the steps carried out by the signal detector selector of FIG. 14.

Blocks of FIG. 15 which have counterpart blocks in FIG. 5 are identified with reference numerals incremented by 900 and will not be described in great detail. In block 1300, the next time slot signal is received. The received signal is stored into the predetection buffer 1207 as shown in block 1301. In block 1305, the less complex detector 1210 synchronizes to the signal, and the less complex detector 1210 detects the time slot signal, block 1307. Error correction decoding is performed on essential symbols of the time slot signal by error correction decoder 1255, block 1308, where the essential symbols are, as described in relation to FIGS. 1 and 13. In block 1310, a CRC code check is performed on the bits represented by the specified symbols by the CRC code checker 1250 in the same manner as described in block 1157 of FIG. 13. In block 1310, it is determined whether the CRC code checks. This block is performed in the same manner as block 1158 of FIG. 13. If the CRC code checks, the decoded essential symbols are reencoded by reencoder 1260, block 1313, in the manner described with respect to block 1161 of FIG. 13. The reencoded essential symbols are stored in a reencoding buffer 1265, as shown in block 1314. In block 1315, a BER for the reencoded essential symbols is determined by the bit error detector 1230. This is accomplished by the less complex detector 1210 redetecting the essential symbols from the buffered signal stored in the predetection buffer 1207. The bit error detector 1230 then compares the detected symbols with the reencoded essential symbols stored in the reencoding buffer 1265. The method then continues to block 1317 where it is determined whether the BER is greater than a BER threshold. If it is determined that the BER is not greater than a BER threshold, the received signal is detected by less complex detector 1210, block 1315. In block 1318, it is determined whether the less complex detector was effective. If the less complex detector was effective, the detected data is output to the remainder of the cellular station for further processing, block 1321, and the next time slot signal is received, as shown in block 1300.

However, if the BER was determined to be greater than the BER threshold in block 1317, or the less complex detector was determined not to be effective in block 1318, or the CRC did not check in block 1310, the method proceeds to block 1324 where power is applied to the more complex detector 1215. In block 1327, the buffered signal is synchronized to the more complex detector 1215. In block 1330, the buffered signal is detected using the more complex detector 1215. It is determined whether the more complex detector is effective, as shown in block 1333. If it is determined that the more complex detector is effective, the method proceeds to block 1336 where the detected data is output to the remainder of the cellular station for further processing, and then to block 1339 where power is applied to the less complex detector 1210. The next time slot signal is received as shown in block 1300. If, however, in block 1333 it is determined that the more complex detector is not effective, the current time slot signal is rejected, block 1342, and power is applied to the less complex detector, as shown in block 1339 and operates as described above.

The use of reencoded essential bits as described, supra, can be used in lieu of the known symbols in the embodiment of the N detector receiver of FIG. 11.

In an alternate embodiment, if a detector uses symbol by symbol detection, the detector of block 1315 is performed only over the nonessential symbols of the signal.

Although enabling and disabling the detectors has been illustrated and described in FIGS. 2–15 as applying power to and removing power from the detectors, enabling and disabling the detectors may alternatively be performed by applying power to an enable pin on each detector, where application of power to the enabled pin allows the detector to operate, and removal of power from the enabled pin places the detector into a standby, or low power mode. Further, where the invention and the detectors are in the form of a purely software embodiment running on one or more programmable controllers, enabling the detectors may be accomplished by accessing portions of the software performing the detector functions, and disabling the detector may be performed by passing over the portions of the software performing the detector functions.

Additionally, although the embodiments have been described with reference to the less complex detector and the more complex detector, in one embodiment, the less complex detector is a differential detector and the more complex detector is an equalizer. Examples of additional types of detectors that could be used in other embodiments include, but are not limited to, multi-pass demodulation detectors, multi-user detectors, and interference cancellation detectors, all of which are known to those schooled in the art. Further, where the term "synchronizes" is used, the synchronization method used is one appropriate for the detection method used.

The invention is disclosed with reference to a TDMA system However, one skilled in the art would realize that the invention may be implemented on a frequency division multiple access system and a code division multiple access system as well.

While a particular embodiment of the present has been described and illustrated, it should be understood that the invention is not limited thereto since modifications may be made by persons skilled in the art. The present application contemplates any and all modifications that fall within the spirit and scope of the underlying invention disclosed and claimed herein.

We claim:

1. In a digital communications system using a signal with a plurality of known symbols, the method of selecting one of a plurality of detectors of differing complexity to conserve power in a receiver comprising:

receiving the signal;

detecting the known symbols in the signal using a less complex detector;

comparing the detected symbols to the plurality of known symbols and determining the bit error rate (BER);

if the bit error rate does not exceed a BER threshold, using the less complex detector;

if the bit error rate exceeds the BER threshold, using a more complex detector;

determining a second BER for the more complex detector;

if the second BER is not excessive, using the more complex detector; and if the second BER is excessive, determining BERs for increasingly complex detectors in succession until a detector has an acceptable BER.

2. The method of claim 1 wherein the signal includes a synchronization sequence for synchronizing the detector in use to the signal and the plurality of known symbols comprises the synchronization sequence.

3. In a Time Division Multiple Access system wherein the signal includes a SYNCWORD for synchronizing the detector in use to the signal, the method of claim 1 wherein the known symbols comprise the SYNCWORD.

4. In a Time Division Multiple Access system including two base stations, the method of claim 1 wherein the signal is broadcast on a traffic channel, the signal including a Coded Digital Verification Color Code (CDVCC) assigned to a mobile station at call setup and used by the mobile station to distinguish among signals transmitted on the same traffic channel by the two base stations, the known symbols comprising the CDVCC.

5. In a Time Division Multiple Access system including two base stations, the method of claim 1 wherein the signal is broadcast on a control channel, the signal including a Coded Super Frame Phase (CSFP) assigned at call setup and used by a mobile station to distinguish among signals transmitted on the same control channel by the base stations, the known symbols comprise the CSFP.

6. The method of claim 1 comprising the step of further determining an effectiveness of the detector in use wherein if the detector is ineffective, a detector of greater complexity is used.

7. The method of claim 6 wherein the step of determining the effectiveness of the detector in use includes:

detecting the signal using the detector in use;

decoding the detected signal using an error correction decoder; and verifying the decoded signal using a cyclic redundancy check encoded into the signal for error detection.

8. The method of claim 1 wherein the signal is transmitted as a plurality of information packets, each information packet including the known symbols, and the BER is a running BER calculated by averaging errors of the known symbols of each information packet for a plurality of information packets.

9. In a Time Division Multiple Access system, the method of claim 8 wherein each information packet is a time slot.

10. The method of claim 1 further comprising the steps of determining the Received Signal Strength (RSS) for the signal and rejecting the signal if the RSS is less than an RSS threshold.

11. The method of claim 1 further comprising the steps of determining a Received Signal Strength (RSS) and rejecting the signal if the BER exceeds the BER threshold and the RSS is less than an RSS threshold.

12. The method of claim 1 further comprising the step of buffering the received signal to prevent loss of the signal, where the more complex detector is used to detect the buffered signal when the BER exceeds the BER threshold.

13. In a Time Division Multiple Access system where the signal is divided and transmitted over a plurality of time slots using a control channel, the method of claim 12 wherein the step of buffering the signal includes storing a time slot of the signal in a buffer.

14. In a Time Division Multiple Access system where the signal is divided and transmitted over a plurality of time slots using a traffic channel, the method of claim 12 wherein the step of buffering the signal includes storing a pair of time slots of the signal in a buffer.

15. The method of claim 1 comprising the step of further determining an effectiveness of the detector in use wherein if the detector is ineffective, a detector of greater complexity is used.

16. The method of claim 1 wherein the signal includes an accuracy verification code for a plurality of essential symbols in the signal and used for determining if the essential symbols are detected and error correction decoded accurately, wherein the known symbols comprise a plurality of assured symbols, generated by:

decoding the detected signal using an error correction decoder;

determining accuracy of the essential symbols in the decoded signal using the accuracy verification code; and error correction reencoding the essential symbols if the essential symbols are determined to be accurate.

17. In a Time Division Multiple Access communications system, the method of claim 16 wherein the accuracy verification code is a Cyclic Redundancy Check code.

18. In a digital communications system including a receiver having a plurality of signal detectors of different complexity and a signal with a plurality of known symbols and data, an improved signal detector selector for conserving power comprising:

a bit error detector responsive to the known symbols detected by the detector of least complexity;

circuitry responsive to the bit error detector for enabling a detector of next greater complexity to detect the data if a bit error rate (BER) exceeds an error threshold; and circuitry responsive to the bit error detector for successively enabling detectors of greater complexity to detect the data if a bit error rate (BER) exceeds an error threshold;

wherein the succession of detectors is stopped once a detector yielding an acceptable bit error rate is found.

19. The selector of claim 18 further including an error correction decoder coupled to the circuitry for decoding the detected data and determining an effectiveness of the detector in use.

20. The selector of claim 18 wherein the circuitry includes a controller for determining if the BER for the known symbols is greater than the error threshold, and an actuator coupled to the two detectors and responsive to the controller wherein the actuator enables the detector of lesser complexity to detect the signal if the BER does not exceed the error threshold, and the actuator enables the detector of greater complexity if the BER exceeds the error threshold.

21. The selector of claim 18 further comprising a received signal strength (RSS) indicator for determining an RSS, wherein the signal is rejected if the RSS is less than an RSS threshold.

22. The selector of claim 18 wherein the detector of lesser complexity is a differential detector.

23. The selector of claim 18 wherein the detector of greater complexity is an equalizer.

24. The selector of claim 18 wherein the detector of greater complexity is an interference canceler.

25. The selector of claim 18 wherein the detector of lesser complexity detects the data if the bit error rate does not exceed the error threshold.

26. The selector of claim 18 wherein the detector of greater complexity is a multi-user detector.

27. The selector of claim 18 wherein the detector of greater complexity is a multi-pass demodulation detector.

* * * * *